(12) United States Patent
Hayashi et al.

(10) Patent No.: US 8,462,213 B2
(45) Date of Patent: Jun. 11, 2013

(54) OPTICAL SYSTEM, IMAGE PICKUP APPARATUS AND INFORMATION CODE READING DEVICE

(75) Inventors: Yusuke Hayashi, Tokyo (JP); Tomoya Sugita, Tokyo (JP); Naoto Ohara, Tokyo (JP)

(73) Assignee: Kyocera Corporation, Kyoto (JP)

( * ) Notice: Subject to any disclaimer, the term of this patent is extended or adjusted under 35 U.S.C. 154(b) by 374 days.

(21) Appl. No.: 12/934,796

(22) PCT Filed: Mar. 27, 2009

(86) PCT No.: PCT/JP2009/056376
§ 371 (c)(1),
(2), (4) Date: Sep. 27, 2010

(87) PCT Pub. No.: WO2009/119838
PCT Pub. Date: Oct. 1, 2009

(65) Prior Publication Data
US 2011/0017827 A1 Jan. 27, 2011

(30) Foreign Application Priority Data
Mar. 27, 2008 (JP) .................................. 2008-084330

(51) Int. Cl.
*H04N 7/18* (2006.01)
(52) U.S. Cl.
USPC ........... 348/160; 348/158; 348/143; 348/135; 348/61
(58) Field of Classification Search
USPC ............................ 348/160, 158, 143, 135, 61
See application file for complete search history.

(56) References Cited

U.S. PATENT DOCUMENTS

| 4,100,570 | A | * | 7/1978 | Nobutoki et al. ............. 348/291 |
|---|---|---|---|---|
| 6,021,005 | A | | 2/2000 | Cathey, Jr. et al. |
| 6,069,738 | A | | 5/2000 | Cathey, Jr. et al. |
| 6,525,302 | B2 | | 2/2003 | Dowski, Jr. et al. |
| 6,642,504 | B2 | | 11/2003 | Cathey, Jr. |
| 7,663,813 | B2 | * | 2/2010 | Lai ................................ 359/770 |
| 2009/0304237 | A1 | * | 12/2009 | Yoshikawa et al. ........... 382/116 |
| 2009/0321618 | A1 | * | 12/2009 | Ohara et al. ................ 250/227.2 |

FOREIGN PATENT DOCUMENTS

| JP | 2003-235794 | 8/2003 |
|---|---|---|
| JP | 2004-153497 | 5/2004 |
| JP | 2007-060647 | 3/2007 |
| JP | 2007-074649 | 7/2007 |
| JP | 2007-300208 | 11/2007 |
| JP | 2008-17157 | 1/2008 |
| WO | 2007/013621 | 2/2007 |
| WO | 2007/074649 | 7/2007 |

OTHER PUBLICATIONS

Edward R. Dowski, Jr, Robert H. Cormack, Scott D. Sarama, Wavefront Coding: jointly optimized optical and digital imaging systems, CDM Optics, Inc., Army Research Laboratory.

(Continued)

Primary Examiner — Shawn An
(74) Attorney, Agent, or Firm — Procopio, Cory, Hargreaves & Savitch LLP

(57) ABSTRACT

An image pickup apparatus including an optical system having an optical element including an optical wavefront modulation function; and a detector at a focal position of the optical system, capturing an object image having passed through the optical system, wherein the optical element including the optical wavefront modulation function has a capability of decreasing an alteration of an optical transfer function in an entire screen due to a difference of object distances, and wherein an absolute value of a focal length of the optical element including the optical wavefront modulation function is greater than an absolute value of a focal length of the entire optical system.

19 Claims, 28 Drawing Sheets

OTHER PUBLICATIONS

Edward R, Dowski, Jr., Gregory E. Johnson, Wavefront Coding: A modern method of achieving high performance and/or low cost imaging systems, CDM Optics, Inc.

PCT/JP2009/056376, International Search Report, ISA/Japsn, May 12, 2009.

* cited by examiner

JAN

CODE49

QR CODE

SPHERICAL
ABERRATION (BEFORE)

SPHERICAL
ABERRATION (AFTER)

Figure 6A
Figure 6B
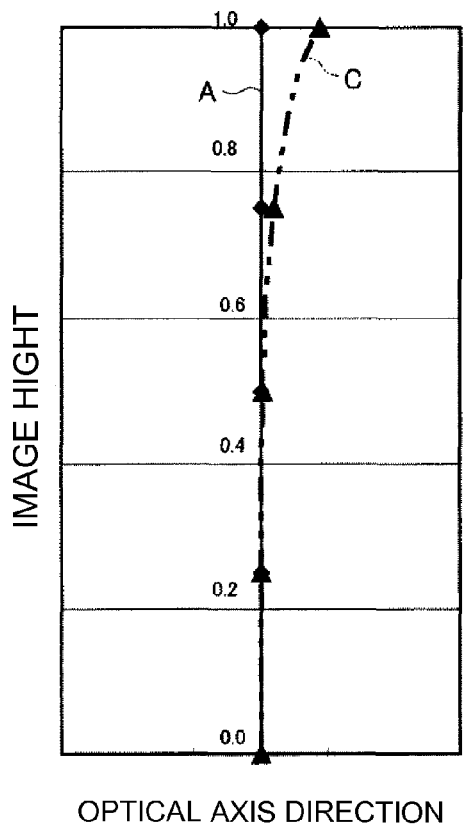
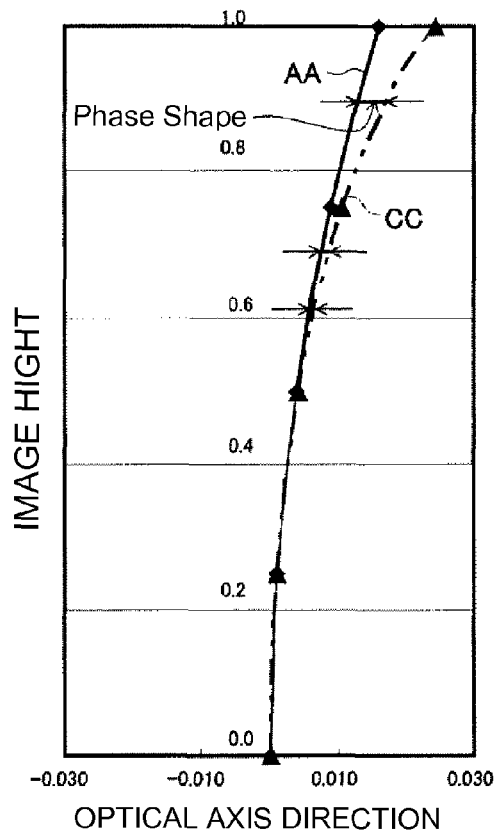
A ——◆—— Without Optical Modulation Element
C ——▲—— With Optical Modulation Element
(without inflection point)
AA ——◆—— Without Optical Modulation Element
CC ——▲—— With Optical Modulation Element
(without inflection point)

Figure 18

EXAMPLE OF KERNEL DATA STORAGE ROM

| OPTICAL MAGNIFICATION | ×1.5 | ×5 | ×10 |
|---|---|---|---|
| KERNEL DATA | A | B | C |

$$A = \begin{bmatrix} a & b \\ c & d \end{bmatrix}$$

$$B = \begin{bmatrix} a' & b' & c' \\ d' & e' & f' \\ g' & h' & i' \end{bmatrix}$$

$$C = \begin{bmatrix} a' & b' & c' & d' \\ e' & f' & g' & h' \\ i' & j' & k' & l' \\ m' & n' & o' & p' \end{bmatrix}$$

Figure 19

EXAMPLE OF KERNEL TABLE

| APERTURE STOP | F2.8 | F4 |
|---|---|---|
| KERNEL | A | B |

$$A = \begin{bmatrix} a & b \\ c & d \end{bmatrix}$$

$$B = \begin{bmatrix} a' & b' & c' \\ d' & e' & f' \\ g' & h' & i' \end{bmatrix}$$

Figure 20

EXAMPLE OF KERNEL TABLE

| OBJECT DISTANCE INFORMATION | 100 mm | 500 mm | 4 m |
|---|---|---|---|
| KERNEL | A | B | C |

$$A = \begin{bmatrix} a & b \\ c & d \end{bmatrix}$$

$$B = \begin{bmatrix} a' & b' & c' \\ d' & e' & f' \\ g' & h' & i' \end{bmatrix}$$

$$C = \begin{bmatrix} a' & b' & c' & d' \\ e' & f' & g' & h' \\ i' & j' & k' & l' \\ m' & n' & o' & p' \end{bmatrix}$$

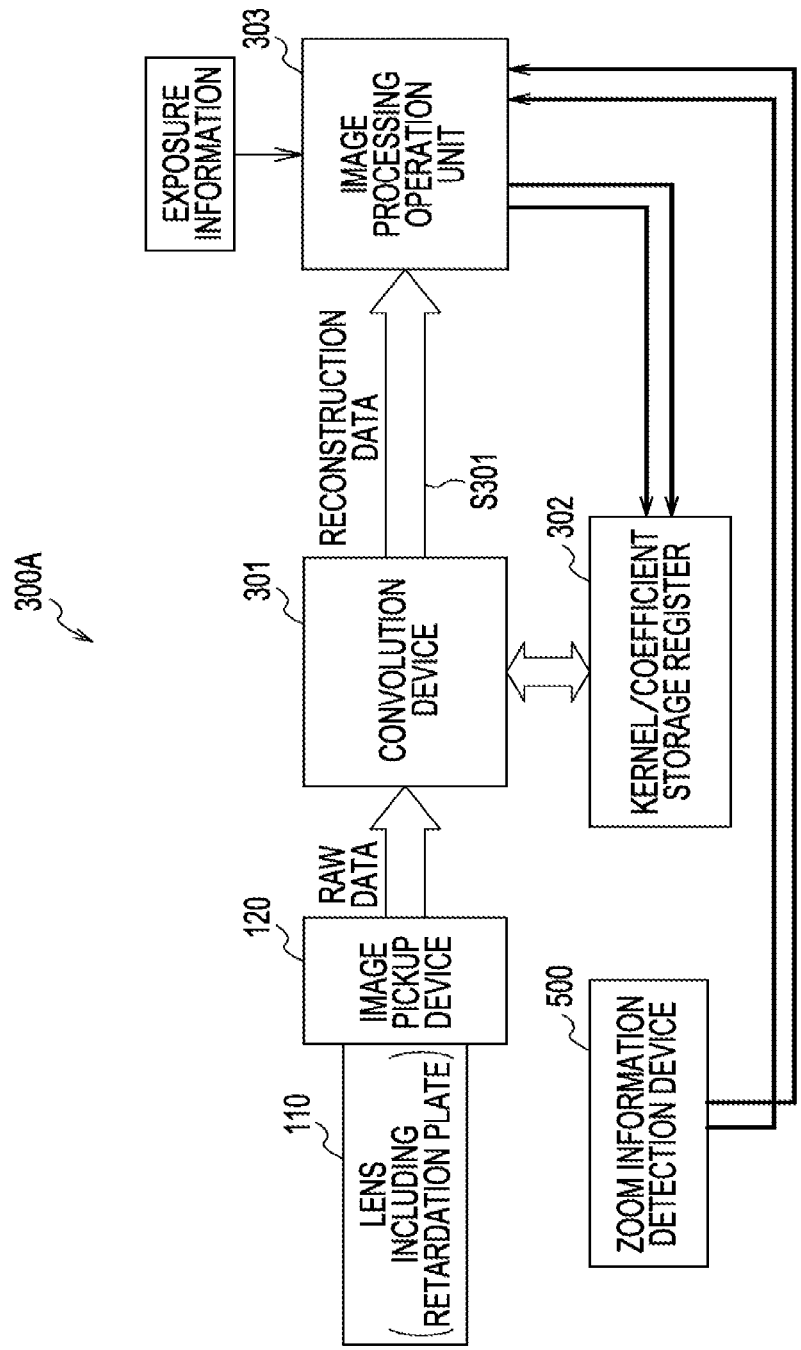

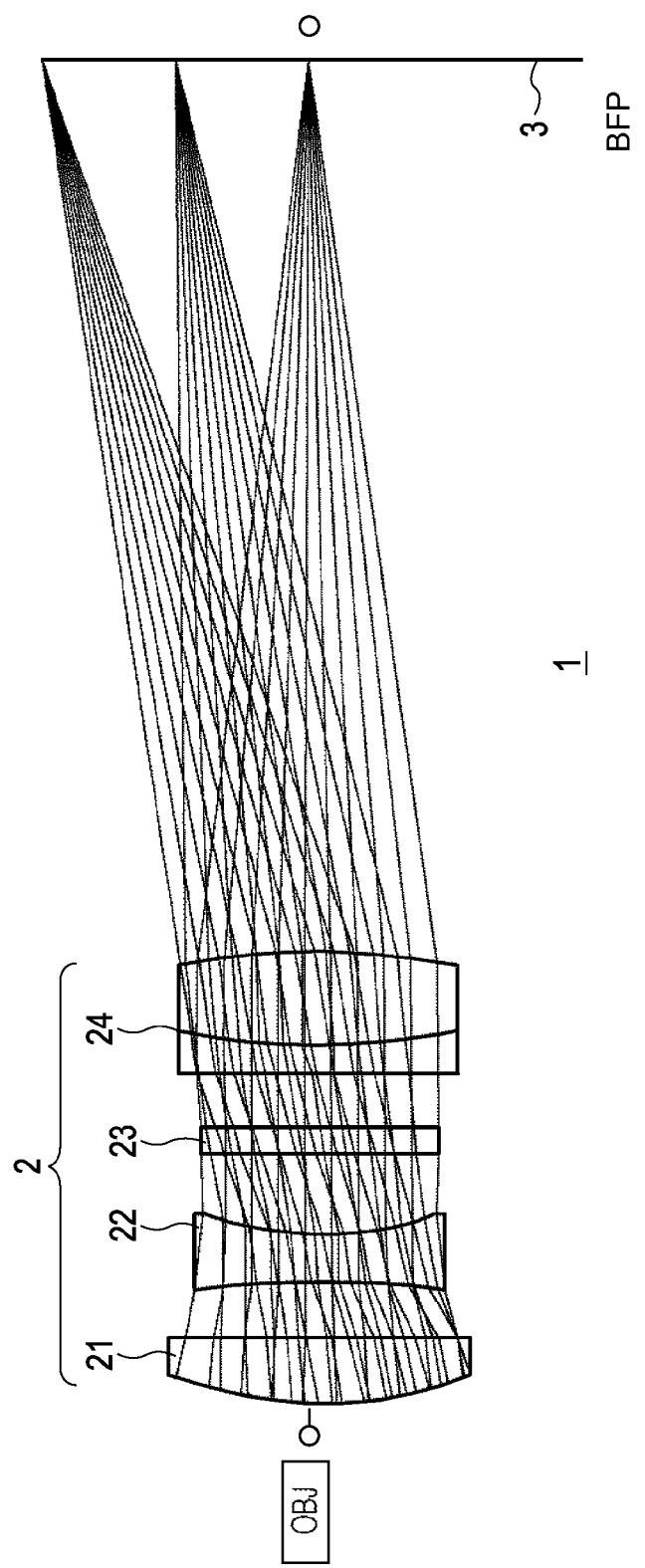

SPOT IMAGES OF OPTICAL SYSTEM

OPTICAL SYSTEM, IMAGE PICKUP APPARATUS AND INFORMATION CODE READING DEVICE

TECHNICAL FIELD

The present invention relates to an image pickup apparatus, and an information code reading device using the image pickup apparatus. Specifically, the present invention relates to an image pickup apparatus that can obtain an image with a large depth of field even if an optical transfer function (OTF) varies or a point spread function (PSF) varies. The present invention also relates to an information code reading device using the image pickup apparatus.

BACKGROUND ART

With the rapid development of digitalization of information, digitalization in image processing is increasingly used. In particular, as symbolized by digital cameras, solid-state detectors, such as Charge Coupled Devices (CCD) and Complementary Metal Oxide Semiconductor (CMOS) sensors, have been mainly provided on imaging planes instead of films.

In this manner, an image of an object is optically taken by an optical system and is extracted by a detector in a form of an electric signal in image pickup apparatuses including a lens system comprising a plurality of lenses and CCDs or CMOS sensors for detectors. Such apparatuses may be used in video cameras, digital video units, personal computers, mobile phones, Personal Digital Assistants (PDAs), image inspection apparatuses, industrial cameras used for automatic control, and the like as well as digital still cameras.

FIG. 27 is a schematic diagram illustrating a structure of an image pickup lens apparatus and traces of light beams. In FIG. 27, the image pickup lens apparatus 1 comprises: an optical system 2 comprising a plurality of lenses; and a detector 3 such as CCD, CMOS sensors and the like. In FIG. 27, the best-focus plane (BFP) of the lens system 2 coincides with an imaging plane of the detector 3. The optical system 2 comprises: lenses 21 and 22 located at an object side (OBJS); an aperture stop 23; and an imaging lens 24. The lenses 21 and 22 at the object side, the aperture stop 23 and the imaging lens 24 are arranged in order along an optical axis O-O from the object side (OBJS) toward the detector 3 side.

In the image pickup lens apparatus 1, the best-focus plane (BFP) coincides with the plane on which the detector is disposed. FIG. 28A through 28C illustrate spot images formed on a light-receiving surface of a detector 3 in the image pickup lens apparatus 1. In FIGS. 28A, 28B and 28C, the horizontal axis refers to the center of gravitational force and the vertical axis refers to depth of field. FIG. 28B illustrates a spot image formed when focused. FIGS. 28A and 28C illustrate spot images when a focal point is displaced by 0.2 mm and −0.2 mm, respectively.

For example, non-patent document 1 and 2, and patent document 1-5 suggest a pickup apparatus in which light beams are regularly blurred by a phase plate and the blurred light beam is reconstructed by digital processing to achieve a large depth of field. An automatic exposure control system for a digital camera in which filtering process using an optical transfer function (OTF) is performed is proposed in Patent document 6.

In devices that have image input functions such as CCD and CMOS sensors, sometimes, it is very useful to read close-up still images such as bar codes, as well as desired images such as landscape images. The first example of known techniques for reading bar codes is, for example, a technique in which focusing (focus) is performed in an auto-focus mode by moving a lens in an optical system. In addition, the second example is a method in which depth expansion technique is applied. The depth expansion technique, for example, is known as a technique in which the depth of field is extended by adjusting an aperture so as to reduce the f-number in a camera, thereby achieving a fixed focus.

Patent Document 1: U.S. Pat. No. 6,021,005.
Patent Document 2: U.S. Pat. No. 6,642,504.
Patent Document 3: U.S. Pat. No. 6,525,302.
Patent Document 4: U.S. Pat. No. 6,069,738.
Patent Document 5: Japanese Patent Application Laid-Open No. 2003-325794.
Patent Document 6: Japanese Patent Application Laid-Open No. 2004-153497
Non-Patent Document 1: "Wavefront Coding; jointly optimized optical and digital imaging systems", Edward R. Dowski, Jr., Robert H. Cormack, Scott D. Sarama.
Non-Patent Document 2: "Wavefront Coding; A modern method of achieving high performance and/or low cost imaging systems", Edward R. Dowski, Jr., Gregory E. Johnson.

DISCLOSURE OF THE INVENTION

Problems to be Solved by the Invention

In the image pickup apparatuses proposed by the aforementioned documents, it is assumed in all the documents that a Point Spread Function (PSF) is constant when the aforementioned phase plate is inserted in the ordinary optical system. If the PSF varies, it is very difficult to obtain an image with a large depth of field by convolution operation using a kernel in the signal processing means that performs signal processing of a captured image by the image pickup apparatus. Therefore, a countermeasure is needed. Aside from single focus lens (one lens) systems with a fixed focal point and constant PSF, in optical systems like zoom systems and autofocus systems, there is a difficulties in the optical design. As a result, we encounter a big problem to adopt such a lens system because of a cost increase due to high precision in the optical design and long working time for the design. In other words, in an image pickup apparatuses with a varied PSF, a suitable convolution operation cannot be performed. Therefore, advanced design is required to eliminate aberrations, such as astigmatism, coma aberration, and zoom chromatic aberration that cause a displacement of a spot image at wide angle or telephoto positions during zoom process. An optical design is very difficult for eliminating such aberrations. Such an optical design causes a problem of an increase in working hours, requiring high-performance lenses or high precision lenses, and we encounter an increase in cost of an optical system. As a result, the cost and size of an image pickup apparatus using such optical system are high.

In abovementioned techniques, as images become out of focus from an in-focus state, the images after image restoration processing in signal processing means are no longer good. A reason thereof is that although a good restoration result is obtained as long as an out-of-focus OTF is constant, the OTF actually reduces. That is, the OTF changes. Accordingly, even if the image restoration processing is performed with a convolution operation in the signal processing means, restoring accurate images completely is difficult because of the nature of the processing that originally blurs and restores the images. As a result, it is difficult to obtain good restored images with foregoing techniques.

Since known phase modulation elements for use in depth expansion optical systems have a difficulty suppressing an influence of an aberration caused by phase modulation at a periphery portion of a screen, a difference between the sizes of spot images at a center of the screen and the periphery portion of the screen tends to increase. Accordingly, in the depth expansion optical systems proposed in the abovementioned references, it is disadvantageously difficult to obtain uniform image quality in a whole screen.

From such a standpoint, it is desired to provide an optical system capable of providing images suitable for the image restoration processing. Additionally, as such an optical system, it is desired to provide an optical system capable of simplifying a configuration of the optical system and lowering the price. In addition, it is desired to provide an image pickup apparatus adopting such an optical system and capable of decreasing a difference between the sizes of spot images in a whole screen, of yielding uniform image quality, and yielding good restored images. Additionally, it is desired to provide an image pickup apparatus adopting the optical system, having a simple apparatus configuration, and capable of lowering the price. Furthermore, it is desired to provide a code reading device using such an image pickup apparatus.

Means for Solving Problems

In an optical system, an optical element including an optical wavefront modulation function is used as an optical system that can provide captured images with using image restoration process in signal processing means while avoiding a complex configuration of the optical system. The optical element including the optical wavefront modulation function has a capability of decreasing an alteration of an optical transfer function (OTF) in a whole screen due to a difference in object distance, and also an absolute value of a focal length of the optical element including the optical wavefront modulation function is greater than an absolute value of a focal length of the entire optical system. The image pickup apparatus includes: an optical system including the optical element including the abovementioned optical wavefront modulation function; and a detector arranged at a focal length of this optical system, and capturing an object image that has passed through this optical system. The optical element including the optical wavefront modulation function has the capability of decreasing the alteration of the optical transfer function in the whole screen due to the difference in the object distance. An absolute value of the focal length of the optical element including the optical wavefront modulation function is greater than an absolute value of the focal length of the entire optical system. As result, the object image on the detector is a dispersed image and is suitable for subsequent signal processing.

The optical element including the optical wavefront modulation function preferably includes an optical wavefront modulation component which is formed on a light exit surface or a light entry surface of a lens. When a difference between a shape of the lens with the optical wavefront modulation component and a shape of the lens without the optical wavefront modulation component is defined as a "phase shape", a shape of the optical element including the optical wavefront modulation function is preferably formed such that the phase shape is rotationally symmetrical around an optical axis of the optical system and increases or decreases in monotone from the optical axis to a periphery portion.

The optical system preferably includes an aperture stop which is located near an exit side of the optical wavefront modulation element.

The optical element including the optical wavefront modulation function preferably generates a dispersed image of the object image at a position at which the detector is located. The image pickup apparatus, preferably, further includes an image processing module for subjecting the dispersed image of the object from the detector having captured the image dispersed by the optical element including the optical wavefront modulation function to a signal process to restore a dispersion-free image. The image processing module preferably performs a convolution operation and restores the dispersion-free image.

According to the present invention, a code reading device which comprises the abovementioned image pickup apparatus, which can read information codes by the image pickup apparatus and which can obtain a dispersed-free image is provided.

Effects of the Invention

According to the present invention, an optical system which can provide an image suitable for the image restoration processing has been provided. According to the present invention, an optical system which can simplify a configuration of the optical system and lowering the price has been provided. According to the present invention, an optical system which can decrease a difference in the sizes of spot images in a whole screen and obtain uniform image quality and good restored images has been provided by adopting the abovementioned optical system. According to the present invention, an optical system which has a simple apparatus configuration and can lower the price has been provided by adopting the abovementioned optical system. According to the present invention, a code reading device using such an image pickup apparatus has been provided.

BRIEF DESCRIPTION OF THE DRAWINGS

FIG. 6A is a diagram illustrating the "phase shape" of the optical wavefront modulation surface of the optical system and FIG. 6B is a diagram illustrating a "surface shape" of the optical wavefront modulation surface of the optical system.

FIG. 18 is a diagram illustrating an optical magnification as an example of kernel data stored in a ROM.

FIG. 19 is a diagram illustrating an F number of an aperture stop as an example of kernel data stored in a ROM.

FIG. 20 is a diagram illustrating an object distance as an example of kernel data stored in a ROM.

FIG. 26 is an exemplary configuration of an image processing module that performs an image processing by combining the object distance information and the exposure information.

FIG. 27 is a schematic diagram illustrating the structure of an image pickup apparatus and traces of light beams.

Figure 1:
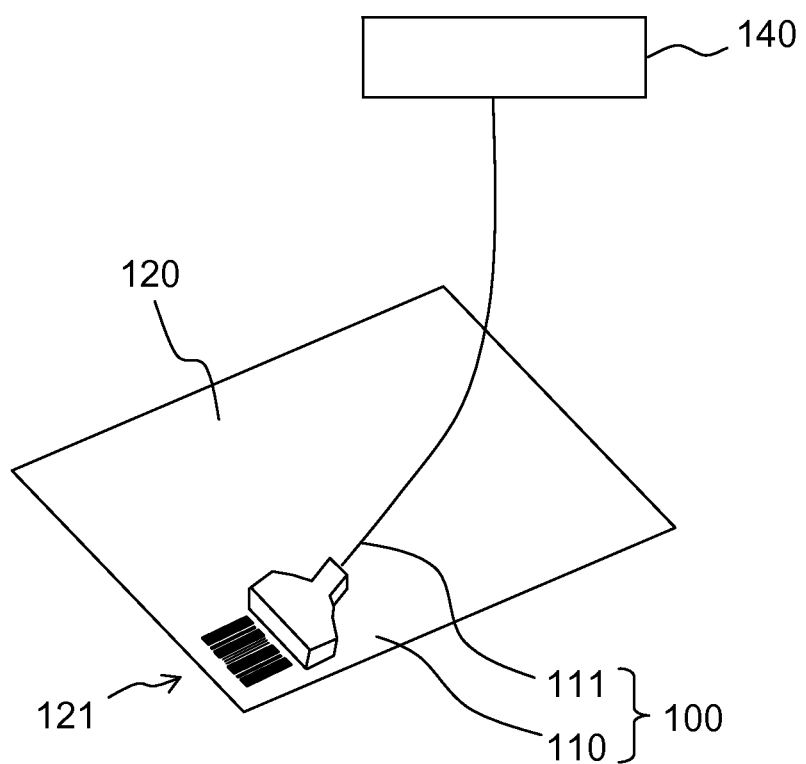
FIG. 1 is an external view of an exemplary information code reading device according to an embodiment of the present invention.

REFERENCE NUMERALS 100 information code reading device
110 main body (image pickup apparatus)
121 information code
200 image pickup apparatus
210 optical system
211 to 213 first to third lenses
213a wavefront modulation surface
214 aperture stop
215 fourth lens
220 detector
230 analog front end unit
240 image processing module
242 two dimensional convolution operator
243 kernel data storage ROM
244 convolution controller
250 camera signal processing module
280 operation unit
290 control module

BEST MODE FOR CARRYING OUT THE INVENTION

Various embodiments achieving desires of the present invention and the other desires will be described in association with the accompanied drawings. Herein, as embodiments, an image pickup apparatus and an optical system applied to the image pickup apparatus will be described. Such an image pickup apparatus can be applied to the information code reading device according to embodiments of the present invention.

Figure 2A:
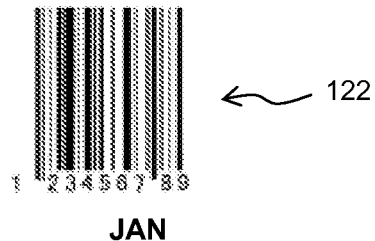
FIGS. 2A to 2C are exemplary codes to be read by the information code reading device shown in FIG. 1.
Figure 2B:
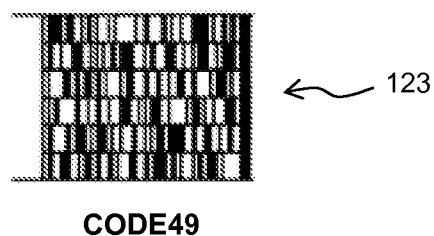
Figure 2C:
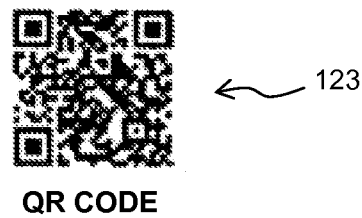
Figure 3:
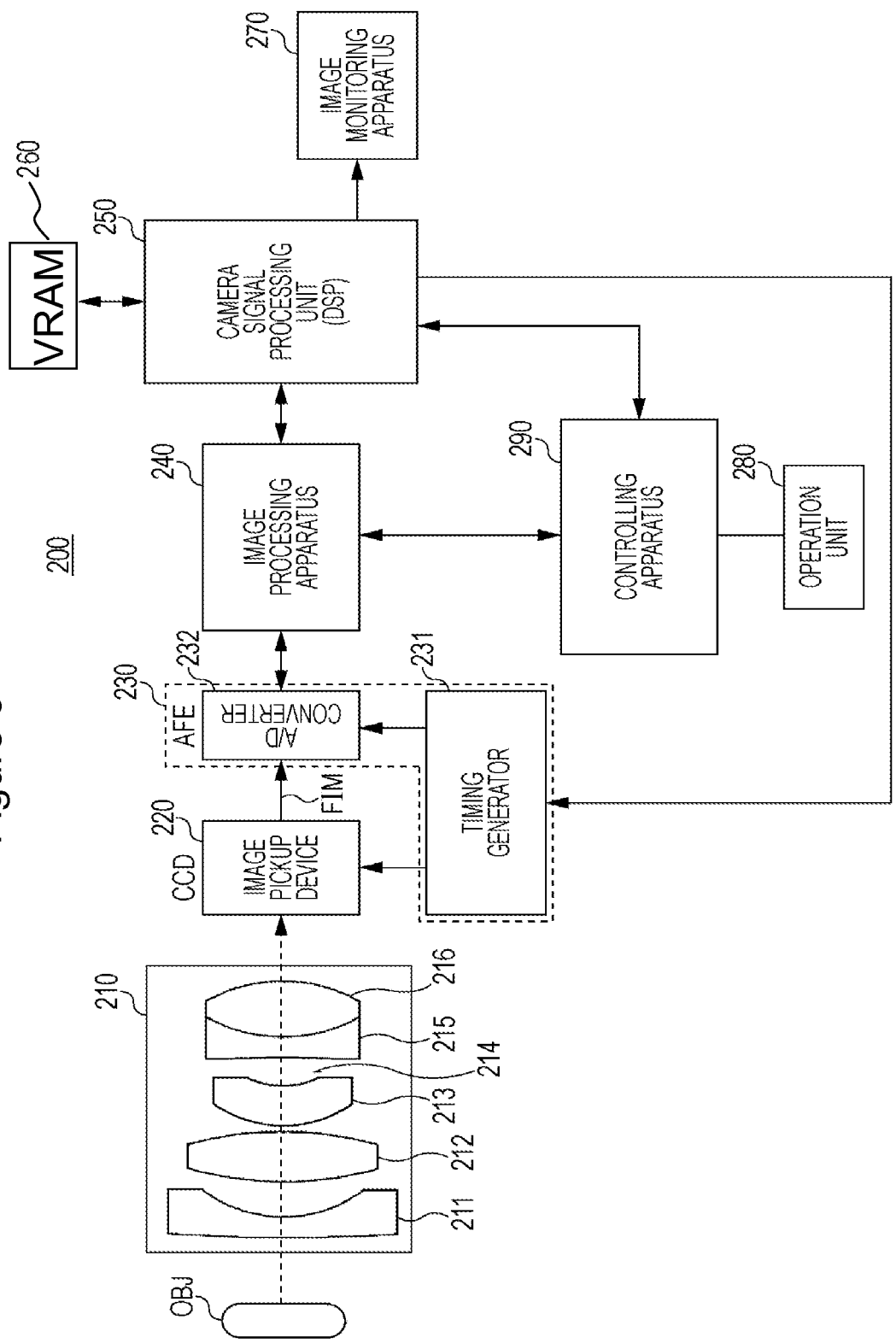
FIG. 3 is a block diagram showing an exemplary configuration of an image pickup apparatus applicable to the information code reading device shown in FIG. 1.

FIG. 1 is an external view of an exemplary information code reading device according to an embodiment of the present invention. FIGS. 2A to 2C are illustration of exemplary codes to be read by the information code reading device shown FIG. 1. FIG. 3 is a block diagram showing an exemplary configuration of an image pickup apparatus applicable to the information code reading device shown in FIG. 1.

Information Code Reading Device

The information code reading device 100 is operable to read an information code 121 such as a symbol or code with different reflection ratio printed on a reading object 120 as shown, for example, one of FIGS. 2A to 2C. The information code reading device 100 comprises a main body 110 and a cable 111. The main body 110 is coupled via the cable 111 to a processing device 140 such as an electronic register, and the like.

The information code to be read by the main body 110 is, for example, a one-dimensional barcode 122 such as the JAN code shown in FIG. 2A, or a two-dimensional barcode 123 such as a stack-type CODE 49 shown in FIG. 2B, or a matrix type QR code shown in FIG. 2C.

An illumination light source (not shown) for irradiating light to the information codes to be read and an image pickup apparatus 200 shown in FIG. 3 can be arranged in the main body 110 of the information code reading device 100.

The image pickup apparatus 200 comprises an optical system 210. The optical system 210 comprises an optical element (hereinafter called a wavefront modulation element) including a optical wavefront modulation function as described later referring to FIG. 4.

In the present invention, the optical wavefront modulation function refers to a function for regularly dispersing a light beam entered to an optical element and outputting light.

An image pickup apparatus 200 regularly disperses light beams by an optical wavefront modulation element and further restores a dispersed image by digital signal processing, thereby being able to generate an image having a deep depth of field.

The image pickup apparatus 200 is used in an information code reading device, and is operable to read accurately and precisely a one-dimensional barcode 122 such as the JAN code shown in FIG. 2A and a two-dimensional barcode 123 such as the stack-type CODE 49 shown in FIG. 2B, or the matrix type QR code shown in FIG. 2C.

As an optical system for generating images having a deep depth of field, a wavefront aberration control optical system or a depth expansion optical system (WFCO: Wave Front Coding Optical System), for example, is known.

Detector

As shown in FIG. 3, an image pickup apparatus 200 built in an information code reading device 100 comprises an optical system 210, a detector 220, an analog front end (AFE) unit 230, an image processing module 240, a camera signal processing module 250, an image display memory 260, an image monitoring device 270, an operating unit 280 and a control module 290.

An output signal FNLIM from the image processing module 240 or an output signal from the camera signal processing module 250 is provided to a processing apparatus 140 such as an electronic register and the like through the cable 111.

Optical System

Figure 4:
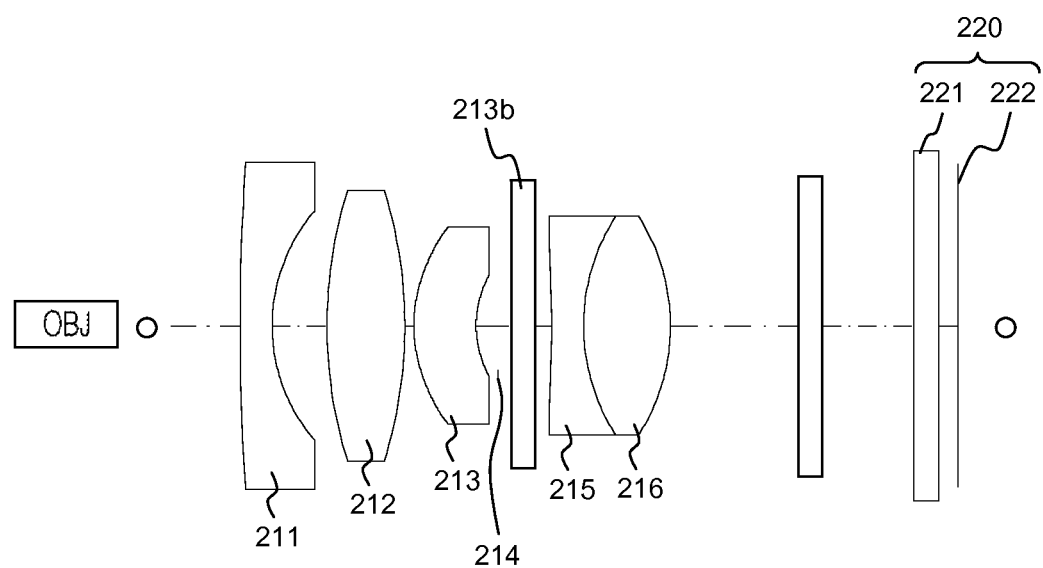
FIG. 4 is an enlarged view schematically illustrating an exemplary arrangement of the optical system and the image pickup apparatus shown in FIG. 3.

FIG. 4 is an illustration of a basic configuration of an imaging lens unit configuring the optical system 210 according to a present embodiment of the optical system shown in FIG. 3. Specifically, FIG. 4 illustrates the configuration of the optical system 210 illustrated in a case in which the optical wavefront modulation surface 213a is arranged near the aperture stop 214.

The optical system 210 provides an object image OBJ to the detector 220. In the optical system 210, a first (piano-concave) lens 211, a second (biconcave) lens 212, a third lens (biconcave) 213, an aperture stop 214, a fourth (plano-concave) lens 215, and a fifth (biconcave) lens 216 are arranged along a optical axis O-O in order from the object side OBJ toward the detector 220.

In the optical system 210, the fourth lens 215 and the fifth lens 216 are joined such that the convex surface of the fifth lens at the outgoing side is joined to the concave surface of the fourth lens 215 at the incoming side, like a thick piano-concave lens. In this manner, the lens unit in the optical system 210 according to the present embodiment is configured to comprise a cemented lens (215 and 216) which functions as an imaging lens.

Optical Wavefront Modulation Element

In the optical system 210, an optical wavefront modulation surface 213a is formed on the lens 213 at an outgoing side for modulating a wave front of incident light to the lens 213.

Alternatively, as substitute for the lens 213 comprising the optical wavefront modulation surface 213a, a lens comprising a optical wavefront modulation element (not shown) having an optical wavefront modulation function corresponding to the optical wavefront modulation surface 213a can be arranged near the aperture stop 214.

In this manner, the optical system 210 is configured to comprise an element having a function of modulating an optical wavefront. The optical wavefront modulation function refers to a function for regularly dispersing a light beam entered to an optical element and outputting light.

A lens 213 comprising the optical wavefront modulation surface 213a is representatively described as a element having a function that modulates an optical wavefront.

In the detector 220 according to the present embodiment, a lens 213 comprising an optical wavefront modulation surface near the aperture stop 214 is used as an optical system 210. Alternatively, the optical wavefront modulation surface 213a is formed at a concave surface of the piano-concave lens 213 at an incoming side and a aperture stop 214 is arranged near the outgoing side of the lens 213. As a result, a change in optical transfer function (OTF) due to object distances (difference of the object distances) is optimized for a wave front coding optical system having OTF smaller than OTF in a optical system not including the optical wavefront modulation surface 213a.

Focal Point

In the optical system 210, an absolute value of a focal point of lens 213 which comprises the optical wavefront modulation surface 213a is larger than that of a focal point of the entire optical system 210. Accordingly, since the absolute value of the focal point of lens 213 which comprises the optical wavefront modulation surface 213a is larger than that of the focal point of the entire optical system 210, the effect of the optical wavefront modulation on the peripheral of the screen is reduced and a uniform image quality is obtained in the whole screen whether the position is at the screen center or the screen periphery. This reason will be described later.

Phase Shape

A difference between a shape of an optical wavefront modulation surface 213a of a lens including an optical wavefront modulation function and a shape of the lens not including the optical wavefront modulation function is referred to as a "phase shape".

In this embodiment, the shape of the optical wavefront modulation surface 213a on a concave exit-side surface of a lens 213 is formed so that the "phase shape" is rotationally symmetrical around an optical axis O-O and increases or decreases in monotone from a center of the optical axis O-O to a periphery portion of a screen.

Setting the phase shape to be rotationally symmetrical around the optical axis O-O makes manufacture of the optical wavefront modulation surface 213a, an optical wavefront modulation element, or a phase modulation element easier, makes the accuracy for attachment in a rotation direction around the optical axis O-O less strict, reduces an influence of reflection, and eliminates contrast variations depending on directions in an image.

Setting the phase shape to increase or decrease in monotone from the center of the optical axis O-O to the periphery portion can make an alteration of an OTF depending on an object distance very small.

A description will be given below for the optical wavefront modulation surface (e.g., a phase modulation surface) causing this "phase shape" to increase or decrease in monotone without an inflection point from the center of the optical axis O-O to the periphery portion of the screen.

In this case, basically as described above, the "phase shape" of the optical wavefront modulation surface is shaped to be rotationally symmetrical about the optical axis O-O. In this embodiment, with an optical system 210 including the optical wavefront modulation function, by intentionally generating, a spherical aberration SA larger than a normal optical system not including an optical wavefront modulation element, the alteration of the OFT depending on the object distance can be made smaller than that of the normal optical system not including the optical wavefront modulation element.

The phase shape of the optical wavefront modulation surface 213a (the phase modulation surface) is formed to increase or decrease in monotone without an inflection point from the center of the optical axis O-O to the periphery portion of the screen.

Figure 5A:
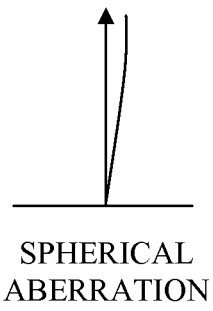
FIG. 5A is a diagram illustrating a spherical aberration of an optical system not comprising an optical wavefront modulation function and FIG. 5B is a diagram illustrating a spherical aberration of an optical system comprising an optical wavefront modulation function
Figure 5B:
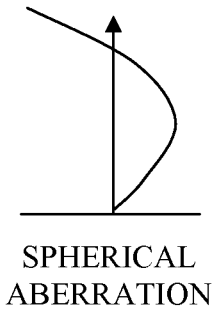

FIG. 5A illustrates a spherical aberration before formation of the optical wavefront modulation surface, and FIG. 5B illustrates a spherical aberration after formation of the optical wavefront modulation surface.

As is understood from the illustration in FIG. 5A and FIG. 5B, the spherical aberration of the optical wavefront modulation surface 213a alone is optimized (minimized) by forming the optical wavefront modulation surface 213a near an aperture stop 214 or by including a function of the aperture stop in the optical wavefront modulation surface 213a, and therefore the optical system 210 can be configured as a high-performance fixed-focus lens having a small wide-range spherical aberration. As a result, a final output image signal of the image pickup apparatus 200 can be highly accurate.

FIG. 6A is a diagram illustrating the "phase shape" of the optical wavefront modulation surface of the optical system. FIG. 6B is a diagram illustrating a "surface shape" of the optical wavefront modulation surface of the optical system. The horizontal axis represents a distance in the optical axis direction. A value of the vertical axis represents a focal position when a diameter of an exit pupil is normalized to 1.

In FIG. 6A, a curve A shows the phase shape if the optical system does not include the optical wavefront modulation element, whereas a curve C illustrates the phase shape if the optical system includes the optical wavefront modulation element.

In FIG. 6B, a curve AA illustrates the surface shape if the optical system does not include the optical wavefront modulation element, whereas a curve CC illustrates the surface shape if the optical system includes the optical wavefront modulation element.

FIG. 6A illustrates a difference between the cases of including and not including the optical wavefront modulation element, i.e., a state after a calculation of a difference=(a value of the curve CC)−(a value of the line AA) in the horizontal direction in FIG. 6(B).

Figure 7:
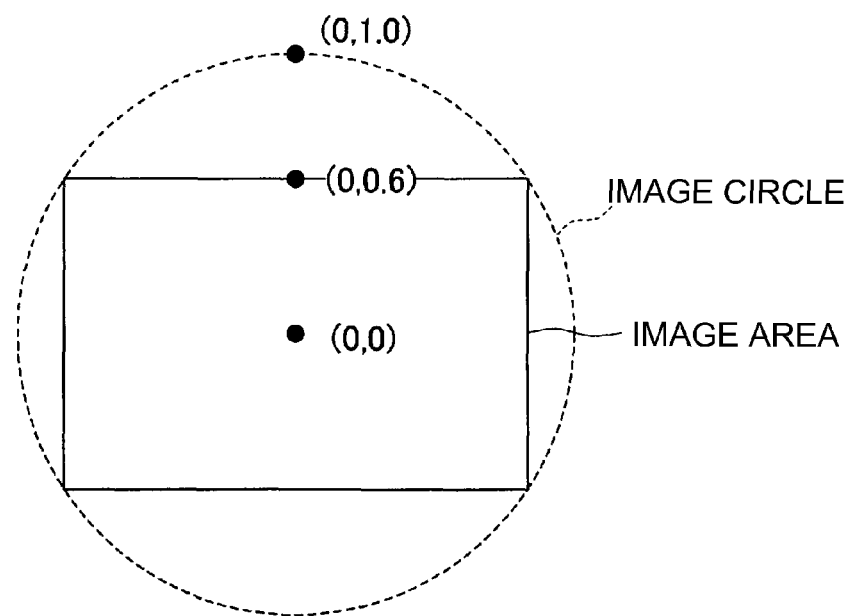
FIG. 7 is a diagram for describing FIGS. 6A and 6B.

FIG. 7 is a diagram illustrating a relationship between an effective image area ID of a detector and an image cycle IC. Coordinates of a position of a center spot are (0, 0). Coordinates of an upper end of the detector ID are (0, 0.6), whereas coordinates of an upper vertical end are (0, 1.0).

As described above, in this embodiment, an absolute value of a focal length $f_{phase}$ of the optical wavefront modulation surface 213a, which is formed on the lens 213 and functions as an optical wavefront modulation element, is greater than an absolute value of a focal length $f_{total}$ of the entire optical system 210. That is, the absolute value of the focal length $f_{phase}$ of the lens 213 including the optical wavefront modulation surface 213a or the optical wavefront modulation element is greater than the absolute value of the focal length $f_{total}$ of the entire optical system 210, i.e., $|f_{phase}|>|f_{total}|$.

Accordingly, power of the optical wavefront modulation surface 213a, which is formed on the lens 213 and functions as the optical wavefront modulation element, is set weaker than power of the entire optical system 210. That is, power of the lens 213 including the optical wavefront modulation surface 213a is set weaker than the power of the entire optical system 210. As a result, a uniform OTF can be obtained from the center (the optical axis O-O) of an image to the periphery portion of the image.

The absolute value of the focal length $f_{phase}$ of the optical wavefront modulation surface 213a (the phase modulation surface) preferably has a following relationship with the focal length $f_{total}$ of the entire optical system 210.

$$|f_{phase}/f_{total}| \geq 2 \quad \text{(Expression 1)}$$

where $f_{phase}$ is the focal length of the lens 213 including the optical wavefront modulation surface 213a, and $f_{total}$ is the focal length of the entire optical system 210.

In this embodiment, the absolute value of the focal length $f_{phase}$ of the optical wavefront modulation element means the absolute value of the focal length of the lens 213 including the optical wavefront modulation surface or the optical wavefront modulation surface 213a.

By setting the phase shape of the optical wavefront modulation surface to increase or decrease in monotone without an inflection point from the center (the optical axis O-O) to the screen periphery, the alteration of the OTF depending on the object distance can be made extremely small.

That is, in FIG. 6, the optical system having the surface shape illustrated by the curve CC can make the alteration of the OTF smaller than that having the surface shape illustrated by the curve BB.

Additionally, by setting the absolute value of the focal length $f_{phase}$ of the optical wavefront modulation surface greater than the focal length $f_{total}$ of the entire optical system 210, the OTF can be uniform from the center (the optical axis O-O) of an image to the periphery portion of the image.

In addition, by setting the absolute value of the focal length $f_{phase}$ of the optical wavefront modulation element (the lens 213) including the optical wavefront modulation surface greater than the focal length $f_{total}$ of the entire optical system 210, the OTF can be uniform from the center (the optical axis O-O) of the image to the periphery portion of the image.

Moreover, shaping the lens 213 including the optical wavefront modulation surface 213a according to the present embodiment to be rotationally symmetrical around the optical axis O-O eliminates adjustment of a position by rotation around the optical axis O-O at the time of attaching the optical wavefront modulation element into a lens tube containing lenses of the optical system 210, allows the lens including the optical wavefront modulation surface 213a to be arranged just like the other lenses, and makes an assembly process easier.

Furthermore, according to the embodiment, a depth of field can be expanded while suppressing generation of a false image and maintaining a naturally blurred image.

Example of Spot Images

Spot images in response to presence or absence of the optical wavefront modulation element 213a in the optical system 210 and presence or absence of an inflection point in the phase shape are discussed with reference to FIGS. 8 to 11. In FIGS. 8 to 11, the vertical axis represents an amount of defocus and the horizontal axis represents an image height.

Figure 8:
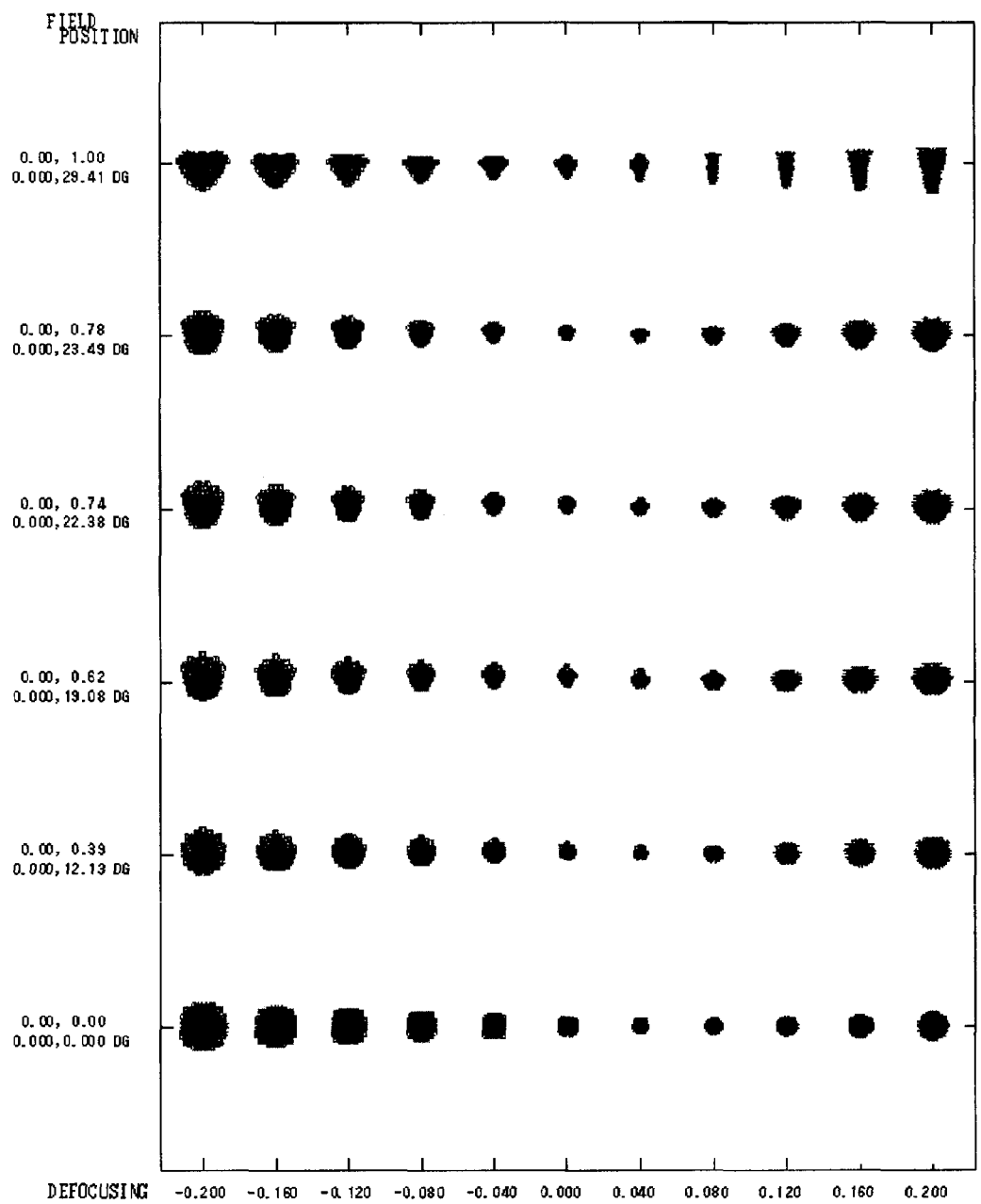
FIG. 8 is a diagram illustrating a defocusing change in spot images in an optical system not including the optical wavefront modulation element.

FIG. 8 is a diagram illustrating a defocusing change in spot images in a general optical system not including the optical wavefront modulation element. Since the optical system of this example does not include the optical wavefront modulation element, the spot images greatly change in response to an object distance.

Figure 9:
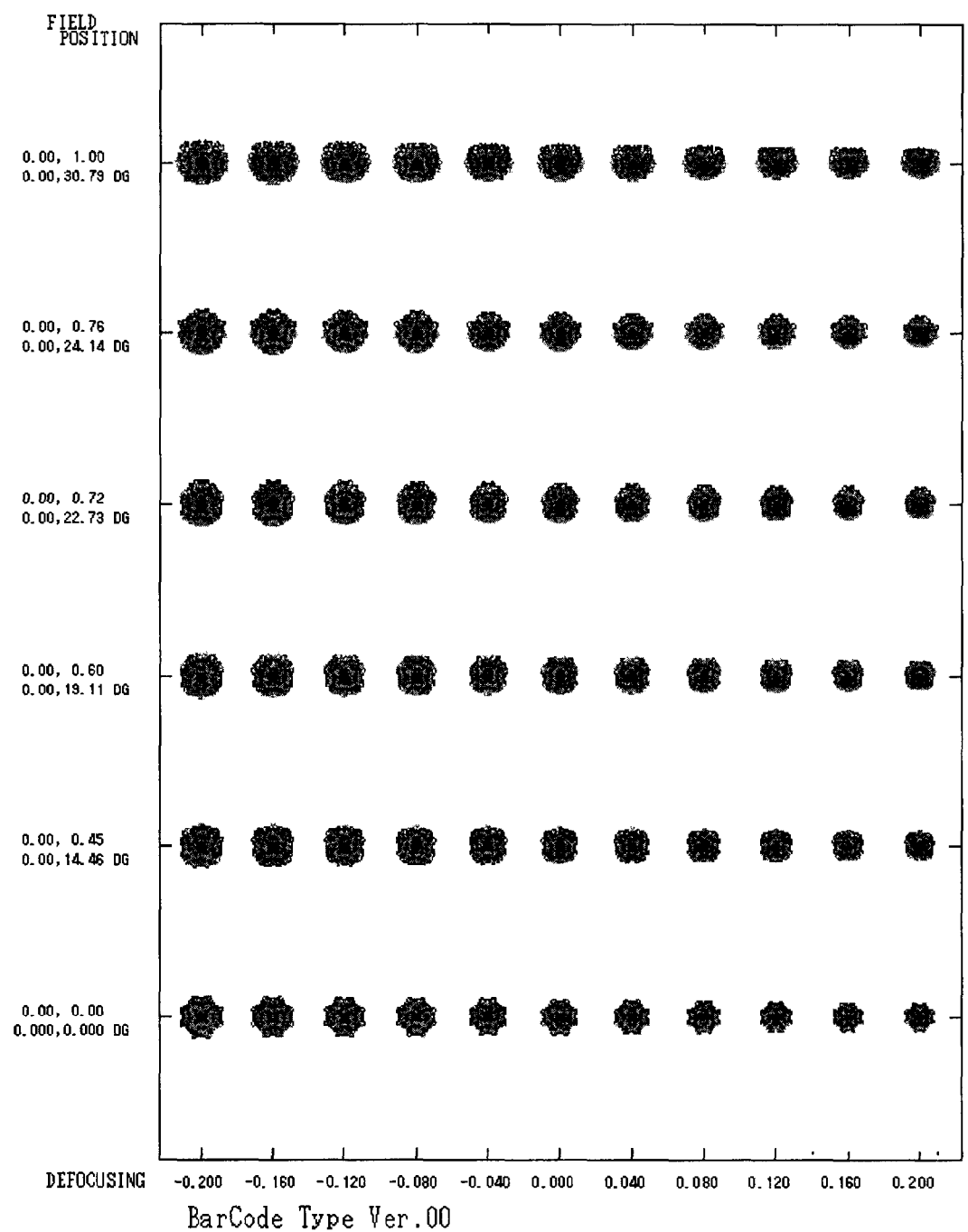
FIG. 9 is a diagram illustrating a defocusing change in spot images in an optical system including the optical wavefront modulation element and having no inflection point.

FIG. 9 is a diagram illustrating a defocusing change in spot images in an optical system including the optical wavefront modulation element having an inflection-point-free phase shape. In the optical system of this example, the change in the spot images in accordance with the object distance is small due to an effect of the optical wavefront modulation element.

Figure 10:
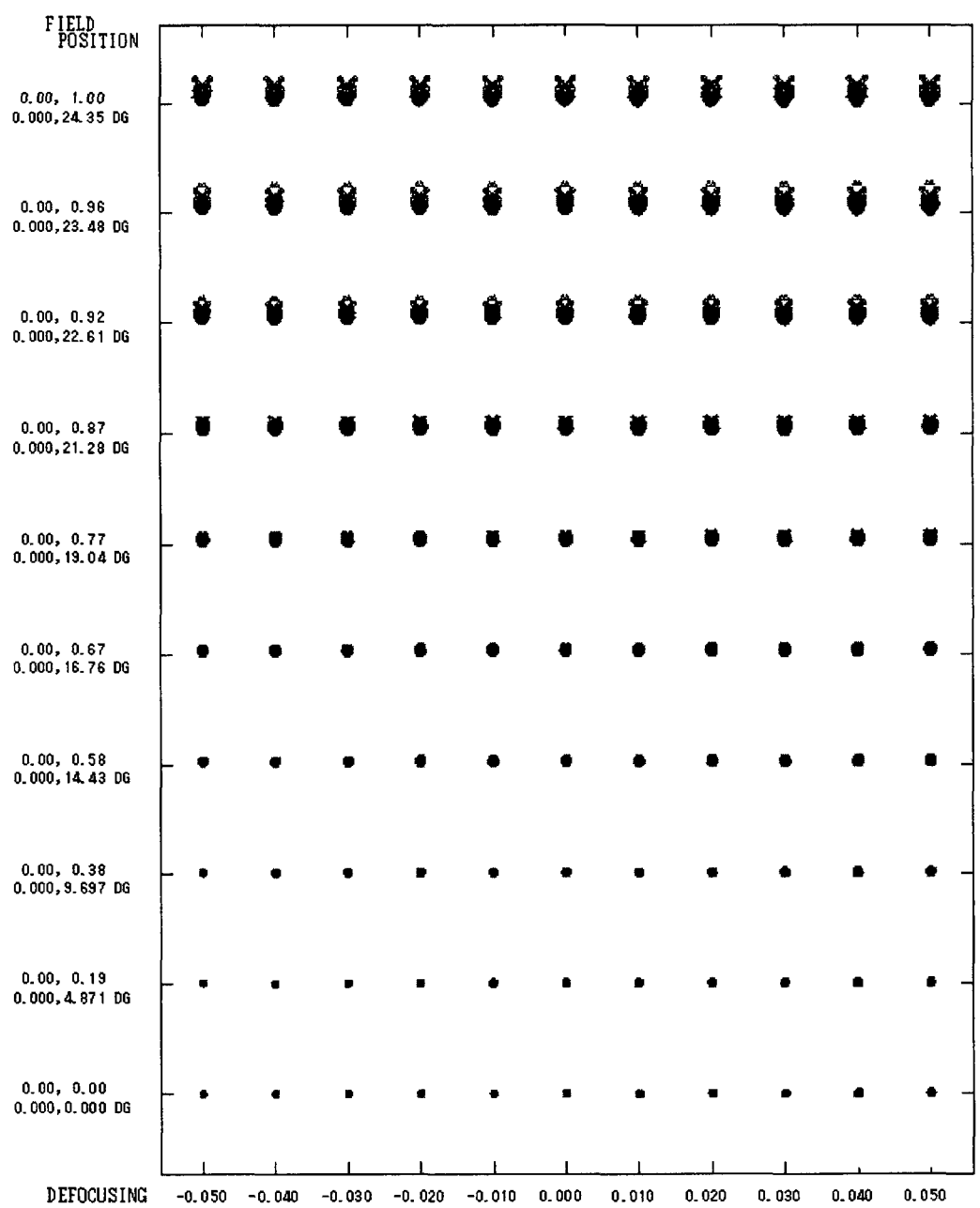
FIG. 10 is a diagram illustrating a defocusing change in spot images in an optical system including the optical wavefront modulation element whose absolute value of a focal length is smaller than an absolute value of a focal length of the entire optical system.

FIG. 10 is a diagram illustrating a change in spot images according to defocusing in an optical system including the optical wavefront modulation element whose absolute value of a focal length is smaller than an absolute value of a focal length of the entire optical system. In the optical system of this example, since the absolute value of the focal length of the optical wavefront modulation element is smaller than the absolute value of the focal length of the entire optical system, a difference between the sizes of the spot images at the center of a screen and at the periphery of the screen is large.

Figure 11:
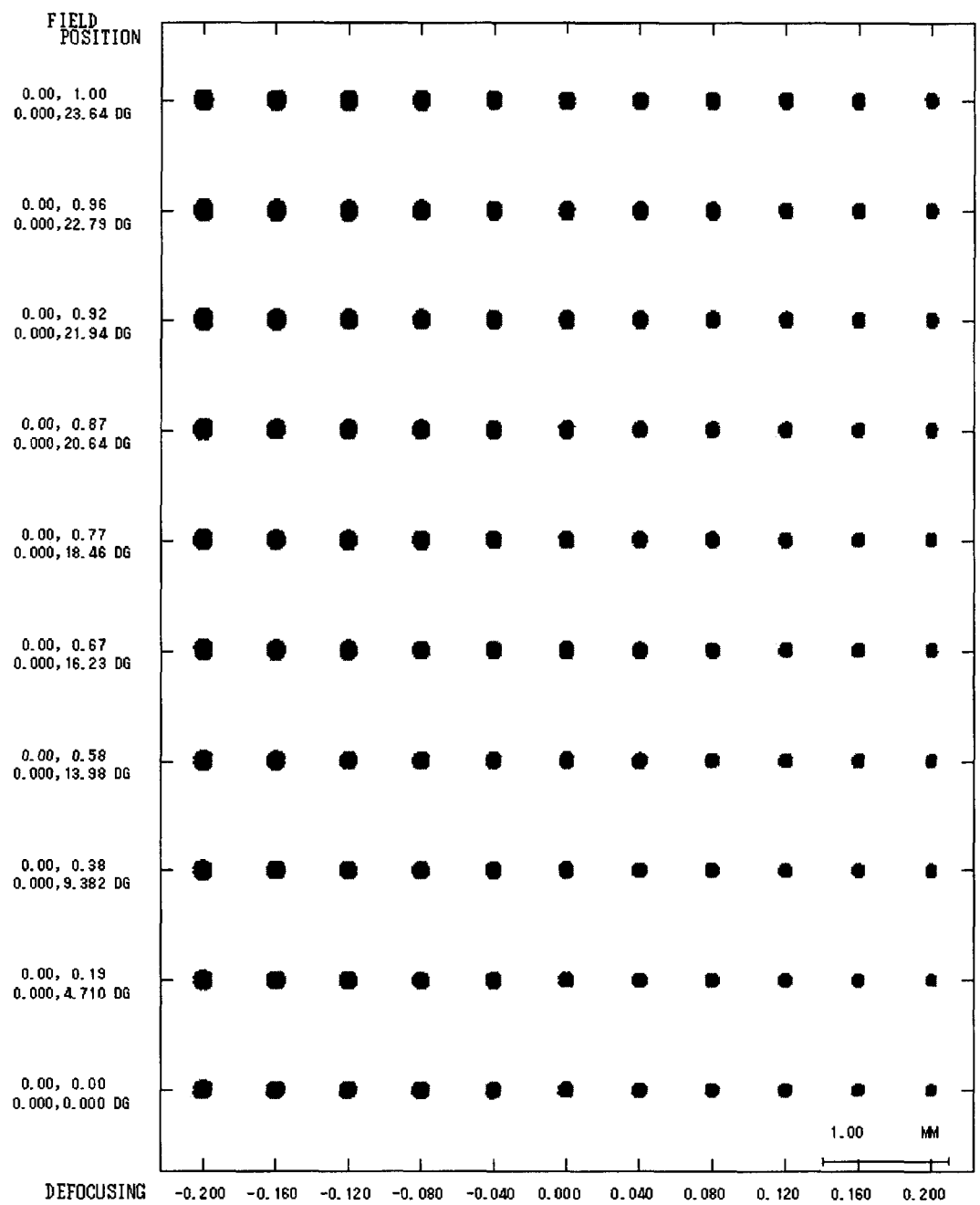
FIG. 11 is a diagram illustrating a defocusing change in spot images in an optical system including the optical wavefront modulation element whose absolute value of a focal length is larger than an absolute value of a focal length of the entire optical system.

FIG. 11 is a diagram illustrating a defocusing change in spot images in an optical system in which absolute value of a focal length of the optical wavefront modulation element is larger than an absolute value of a focal length of the entire optical system. In the optical system of this example, since the absolute value of the focal length of the optical wavefront modulation element is larger than the absolute value of the focal length of the entire optical system, a difference between the sizes of the spot images at the center of a screen and at the periphery of the screen is small.

If the absolute value of the focal length $f_{phase}$ of the optical wavefront modulation surface (or the lens 213 including the optical wavefront modulation surface) is smaller than the absolute value of the focal length $f_{total}$ of the entire optical system 210, it is difficult to suppress an influence of optical wavefront modulation at the periphery portion of the screen and the difference between the sizes of the spot images at the center of the screen and the periphery portion of the screen is large as illustrated in FIG. 10. In this case, it is difficult to obtain uniform image quality in the whole screen.

In contrast, since the optical system 210 according to the embodiment, in which the absolute value of the focal length $f_{phase}$ of the optical wavefront modulation surface (or the lens including the optical wavefront modulation surface) is greater than the absolute value of the focal length $f_{total}$ of the entire optical system, can suppress the influence of the optical wavefront modulation at the periphery portion of the screen, the difference between the sizes of the spot images at the center of the screen and the periphery portion of the screen is small as illustrated in FIG. 11. Since the embodiment corresponds to such an example, uniform image quality is obtained in the whole screen in this embodiment whether the position is at the screen center or the screen periphery.

The characteristic configuration, functions, and advantages of the optical system 210 whose configuration is illustrated and discussed in FIG. 4 and that includes the optical wavefront modulation function have been described above as the embodiment.

The configuration and functions of other parts such as the image pickup apparatus, the image processing device and the like are described below.

Detector

In the detector 220 illustrated in FIG. 3, for example as shown schematically in FIG. 4A, has a plane parallel plate (cover glass) 221 made of glass and an imaging plane 222 of the detector such as CCD, CMOS and the like, are arranged in order from the fifth lens 216 side.

The light from the object OBJ through the imaging optical system 210 is imaged on the imaging plane 222 of the detector 220.

A object dispersed image taken by the detector 220 is not focused (out of focus) on the detector 220 via the optical wavefront modulation surface 213a in the optical system 210, and is an image formed with a light beam of deep depth and blurred portion.

The image pickup apparatus 200 is configured such that a resolution corresponding the object distance can be complemented by subjecting the above image to a filtering process in the image processing module 240. The details of the optical system 210 are described later.

As shown in FIG. 3, a image in the optical system 210 is captured on the imaging plane 222 of the detector 220 and the detector 220 I made of CCD or CMOS sensor which outputs the first captured image information as the first image signal FIM of a electric signal to the image processing module 240 via the analog front end unit (AFE). In FIG. 3, CCD is described as an example of the detector 220.

The AFE unit 230 includes a timing controller 231 and an analog/digital (A/D) converter 232. The timing controller 231 generates a driving timing signal based on the control signal S250 from the camera signal processing module 250 which will be explained later for driving the CCD in the detector 220 which uses CCD and outputs the generated driving timing signal to the detector 220. The A/D converter 232 converts an analog signal input from the detector 220 into a digital signal, and outputs the digital signal to the image processing module 240.

The image processing module 240 serving as two-dimensional convolution means and constituting part of a signal processing module of this invention is preferably realized with a computer.

The image processing module 240 receives the digital signal representing the picked-up image in the detector 220 input from the AFE unit 230, subject the digital signal to a two dimensional convolution operating process, and output the result to the camera signal processing module (DSP) 250 in the subsequent stage.

The image processing module 240 performs filtering processing on the OTF in accordance with exposure information RP input from a control module 290. The exposure information RP includes aperture stop information.

The image processing module 240 includes a function for executing the filtering processing, e.g., convolution filtering processing, on a plurality of images captured by the detector 220 to improve a response of the OTF and eliminate the alteration of the OTF depending on the object distance. As a result, images having a deep depth of field can be obtained although the processing depends on a plurality of object distances.

Additionally, the image processing module 240 includes a function for executing noise-reduction filtering in an early stage.

Additionally, the image processing module 240 includes a function for executing filtering processing on the OTF and executing contrast improving processing.

The processing in the image processing module 240 will be described later.

The camera signal processing module 250 is configured by using a computer and preferably by a digital signal processor (DSP) which can have a high speed processing. The camera signal processing module 250 performs processes including color interpolation, white balancing, conversion between brightness Y and color difference CbCr, compression, filing, and the like, stores data in the memory 260, and displays images on the image monitoring device 270.

The control module 290, for example, is configured by using a computer, controls the aperture stop 214 to perform exposure control, determines the overall operation of the image pickup apparatus on the basis of the operation inputs from the operating unit 280 and the like by a user, and controls the AFE unit 230, the image processing module 240, camera signal processing module 250, the aperture stop 214 in the optical system 210, and the like, so as to perform adjustment and control of each element of the overall image pickup apparatus 200.

The configuration and functions of the optical system 210 and the image processing module according to the present embodiment are described.

The filtering process in the image processing module 240 is described.

In the present embodiment, light beams converged by the optical system 210 are regularly dispersed from the optical axis O-O to the periphery by the lens 213 including the optical wavefront modulation surface 213a functioning as the optical wavefront modulation element. In this way, dispersion of the light beams by insertion of the optical wavefront modulation element 213a in the optical system 210 realizes a blurred (out-of-focus) image which is not focused everywhere on an imaging surface 222 of the detector 220.

In other words, the optical system 210 including the optical wavefront modulation surface 213a (the optical wavefront modulation element) forms light beams having a deep depth of focus and playing a central role in image formation, and flare (a blurred portion).

As described before, means for restoring a focused image by digital processing without moving lenses in the optical system 210 from this regularly dispersed image generated by the optical system 210 including the lens 213 (the optical wavefront modulation element) with the optical wavefront modulation surface 213a is referred to as a wavefront aberration control optical system or a depth expansion optical system. The restoration processing is performed in the image processing module 240.

Figure 12:
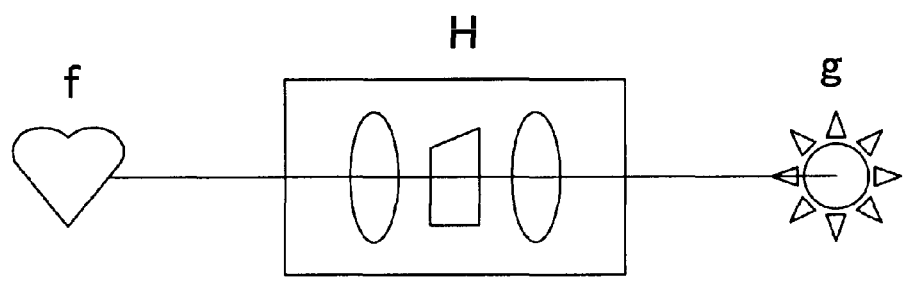
FIG. 12 is a diagram for explaining a principle of a wave front coding optical (WFCO) system.

Referring to FIG. 12, the basic principle of the WFCO is described below. When an object image f is supplied to the WFCO having a property represented by a function H, an image g is generated.

This operation is expressed by the following equation:

$$g = H*f$$

where '*' is an operator indicating convolution.

In order to obtain an image f of the object from the generated image g, the following reverse conversion process is performed. $H^{-1}$ represents the inverse function of a function H.

A kernel size and a coefficient of the H function are described below. ZPn, ZPn−1, . . . are zoom positions when the lenses are moved for zooming and Hn, Hn−1, . . . are the respective H functions. Since the corresponding spot images differ from each other, the H functions is expressed with using conversion coefficients a, b, c, d, d and f as follows:

$$Hn = \begin{pmatrix} a & b & c \\ d & e & f \end{pmatrix}$$

$$Hn-1 = \begin{pmatrix} a' & b' & c' \\ d' & e' & f' \\ g' & h' & i' \end{pmatrix}$$

The difference in the number of rows and/or columns in the above matrices is called a kernel size, and each of the numbers in the matrices is called a coefficient.

Each of the H functions may be stored in a memory of image processing module 240. Alternatively, the PSF may be set as a function of object distance and the coefficients a, b, c, d, d and f may be calculated on the basis of the object distance, then set an appropriate filter to be made for the convolution filter corresponding to any object distance by calculating H function with using those values. In such a case, a filter optimum for an arbitrary object distance can be obtained. Alternatively, the H function may be directly determined from the object distance as a function of object distance.

In the present embodiment, as shown in FIG. 3, as described in FIG. 3, the image taken by the optical system 210 is picked up by the detector 220, and is input to the image processing module 240 at a "aperture open mode" when the aperture stop 214 is open.

The image processing module 240 acquires a coefficient that corresponds to the optical system 210. The image processing module 240 also generates an image signal with a smaller blur than that of the blurred-image signal from the detector 220 using the acquired coefficient.

In the present embodiment, the WFCO is used so that a high-definition image can be obtained, the structure of the optical system can be simplified, and the costs of the image pickup apparatus 200 can be reduced.

The image processing module 240 receives the first image FIM by the detector 220 via A/D converter 232, and performs a process such as a convolution operation for expanding the depth performed by the filter. Accordingly, a final high-definition image FNLIM is generated.

Figure 13:
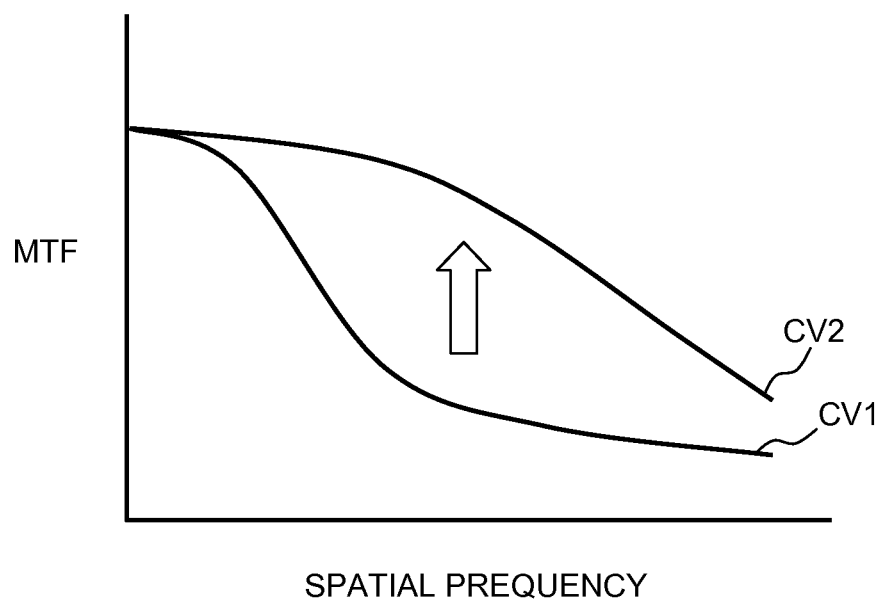
FIG. 13 is a diagram for explaining an MTF correction process performed by an image processing module shown in FIG. 3.

In the Modified Optical Transfer Function (MTF) correction process performed by the image processing module 240, for example, the MTF of the first image, which is essentially low as shown by the curve CV1 in FIG. 13, is corrected to make an MTF closer to the characteristic shown by the curve CV2 in FIG. 13 by edge emphasis, chroma emphasis and the like using the spatial frequency as a parameter.

The characteristic shown by the curve CV2 in FIG. 13 is obtained if, for example, the wavefront shape is not changed (modulated) without using a wavefront forming optical element such as an optical wavefront modulation element 213a as seen in the present embodiment. For the image processing module 240 in the present embodiment, all corrections are performed using the spatial frequency as a parameter.

Figure 14:
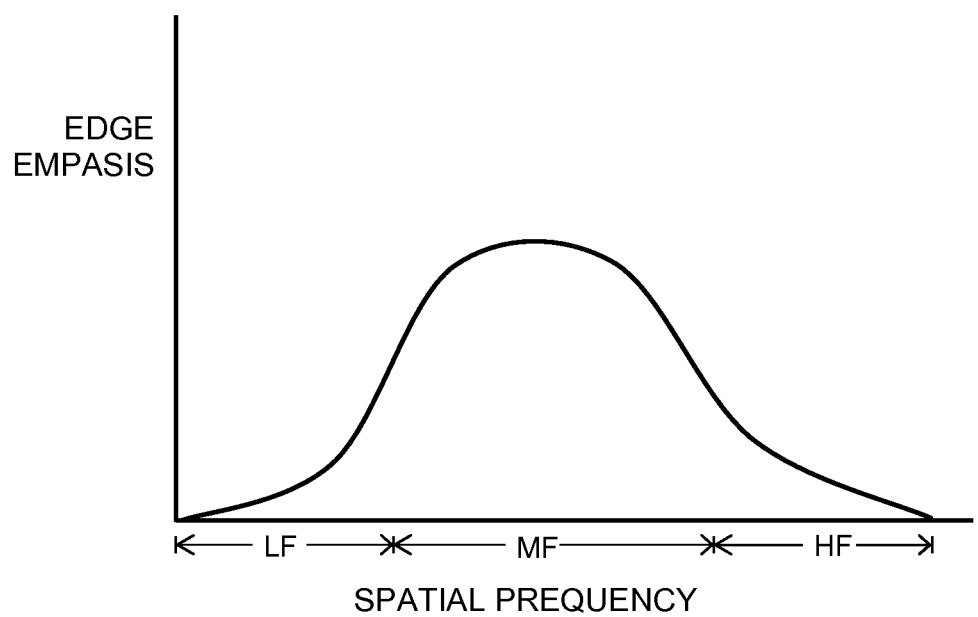
FIG. 14 is a diagram for specifically explaining the MTF correction process performed by the image processing module shown in FIG. 3.

In the present embodiment, as shown FIG. 13, in order to obtain the final MTF characteristic curve CV2 which is a final goal to be obtained from the MTF characteristic curve CV1 corresponding to the optically obtained special frequencies, the original image (first image) is corrected with respect to the respective spatial frequencies by adding a stronger and weaker such as edge emphasis or the like as shown in FIG. 14.

For example, an edge emphasis curve for the MTF characteristic shown in FIG. 13 with respect to the spatial frequency is shown in FIG. 14.

In FIG. 14, the degree of edge emphasis is reduced at a low-frequency (LF) side and a high-frequency (HF) side of a predetermined spatial frequency range and is increased in an intermediate frequency region of the predetermined spatial frequency range. Accordingly, the desired MTF characteristic curve CV2 shown in FIG. 13 is virtually obtained.

In this manner, the image pickup apparatus 200 according to the present embodiment consisting essentially of: the optical system 210 having the optical wavefront modulation function and generating a first image and the detector 220; and the image processing module 240 forming the final high-definition image from the first image.

The optical system 210 is newly provided with an optical wavefront modulation element for wavefront formation such as the optical wavefront modulation surface 213a, or is provided with a surface of an optical element (lens 213) such as glass or plastic, the surface formed for wavefront formation (optical wavefront modulation surface 213a).

The wavefront for the image formation is changed (modulated) by lens 213 comprising the optical wavefront modulation surface 213a, and from thus modulated wave front an image is formed on the imaging plane (light-receiving surface) 222 of the detector 220 made of a CCD or a CMOS sensor.

This formed image obtained on the imaging plane of the detector 220 is an out-of-focus image, and the image-formed first image is turned to a high resolution image by the image processing module 240. In the present embodiment, the first image obtained by the detector 220 is in light beam conditions with an extremely large depth. Therefore, the MTF of the first image is basically low, and is corrected by the image processing module 240.

Wave Optical Consideration

The image-forming process performed by the image pickup apparatus 200 according to the present embodiment is discussed below from the wave-optical point of view.

When a spherical wave emitted from a single point of an object passes through an imaging optical system 210, for example, the spherical wave is converted into a convergent wave. At this time, aberrations are generated unless the imaging optical system is an ideal optical system. The wavefront shape is changed into a complex shape instead of a spherical shape. Wavefront optics is the science that connects geometrical optics with wave optics, and is useful in dealing with the phenomenon of wavefront.

If the wave-optical MTF at the imaging plane is considered, information of the wavefront at the exit pupil position in the imaging optical system becomes important. The MTF can be calculated by the Fourier transform of wave-optical intensity distribution at the focal point. The wave-optical intensity distribution is obtained as a square of wave-optical amplitude distribution, which is obtained by the Fourier transform of a pupil function at the exit pupil.

The pupil function is the wavefront information (wavefront aberration) at the exit pupil position. Therefore, for example, the MTF can be calculated if the wavefront aberration of the optical system 210 can be accurately calculated.

Accordingly, the MTF value at an arbitrary imaging plane can be changed by subjecting the wavefront information at the exit pupil position to a signal processing by a predetermined process.

Also in the present embodiment, the wavefront shape is changed mainly by an optical wavefront forming element such as the lens 213 that includes the optical wavefront modulation element 213a, that is, by varying the phase, the light pass length along the light beam so as to form the desired wavefront.

If the desired wavefront formation is performed, light beam output from the exit pupil is made of an image including portions where the light beam is dense and portions where the light beam is sparse, as is clear from the geometrical optical spot images.

The MTF in this state has a characteristic in which MTF is low in regions where the spatial frequency is low and a certain resolution is obtained in regions where the spatial frequency is high.

In other words, if the MTF value is low, or if the above-mentioned geometrical optical spot images are obtained, aliasing does not occur. Therefore, a low-pass filter is unnecessary. Then, flare images, which cause the reduction in the MTF value, are removed by the image processing module 240. Accordingly the MTF value is considerably increased.

Wave Optical Consideration

Figure 15:
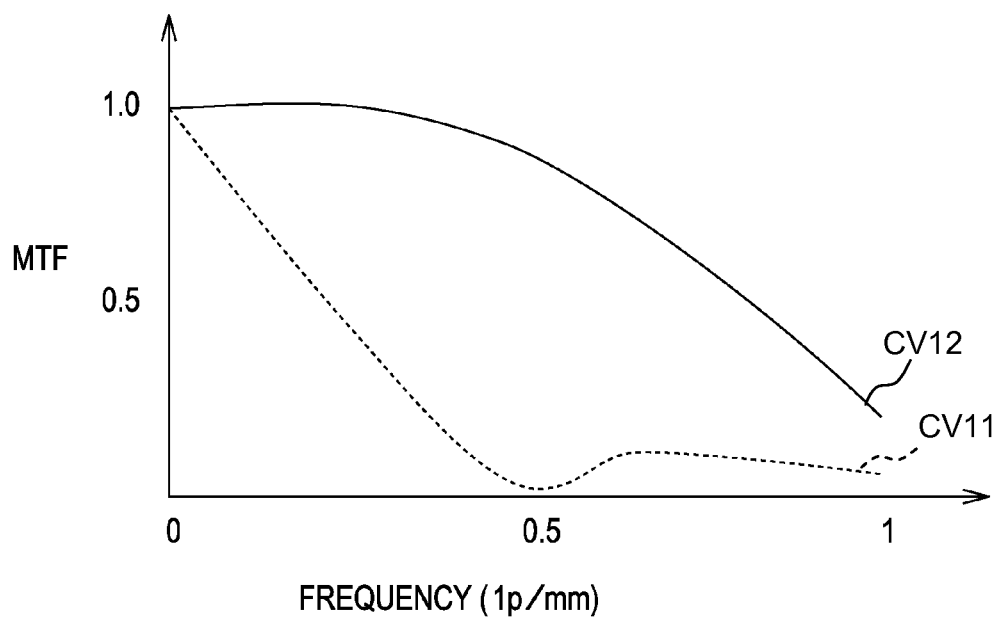
FIG. 15 is a diagram illustrating the MTF response obtained when an object is in focus and when the object is out of focus in an existing optical system.
Figure 16:
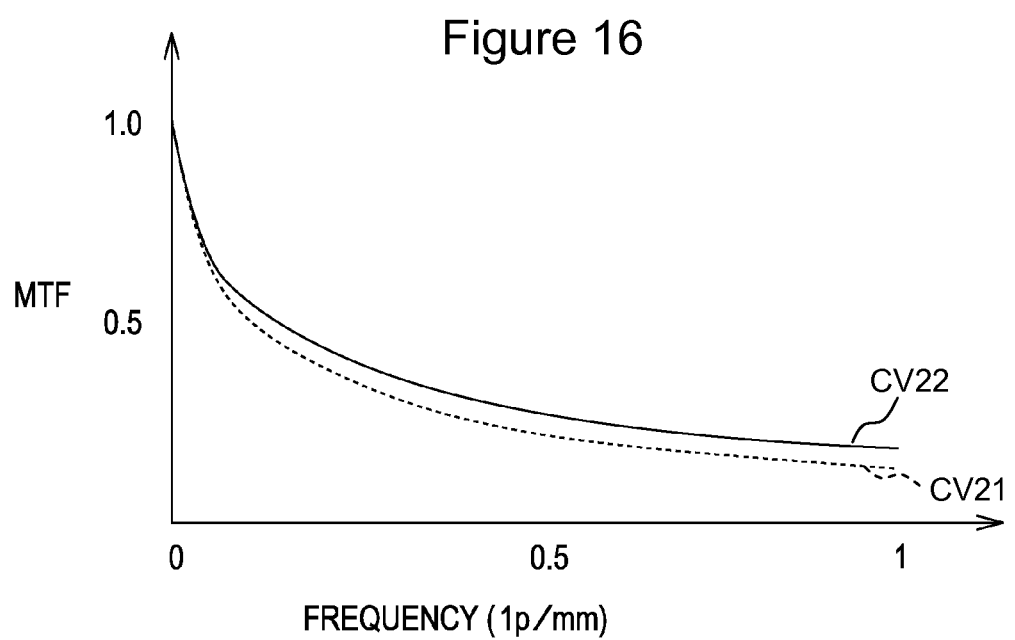
FIG. 16 is a diagram illustrating the MTF response obtained when an object is in focus and when the object is out of focus in the optical system comprising an optical wavefront modulation element according to the present embodiment.
Figure 17:
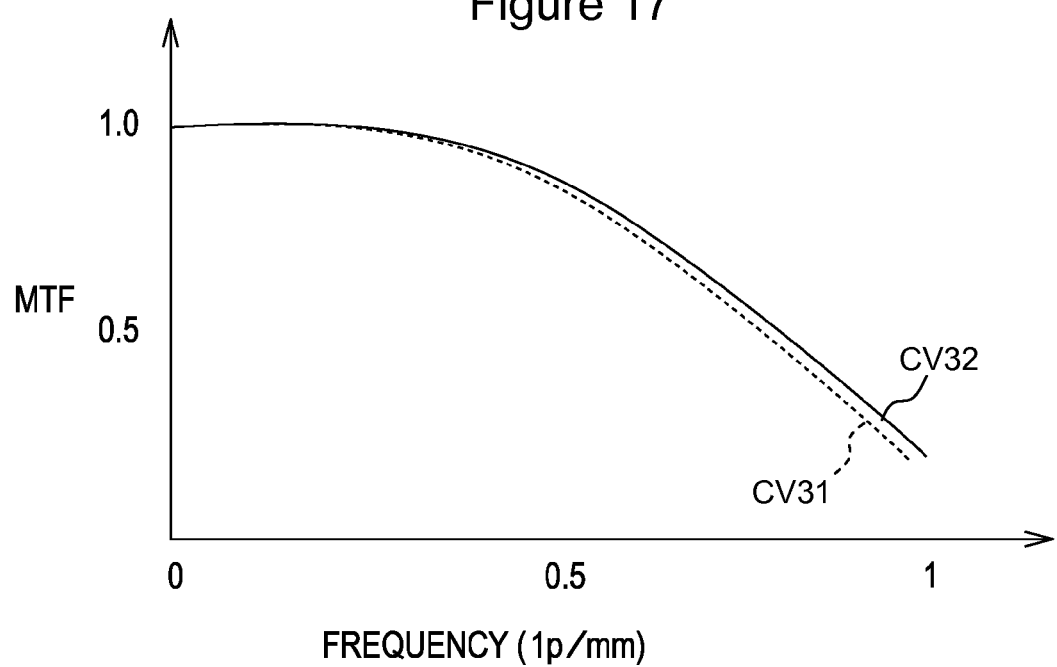
FIG. 17 is a diagram illustrating the MTF response obtained after data reconstruction in the image pickup apparatus according to the present embodiment.

Referring to FIGS. 15 to 17, an MTF response in the present embodiment and that of an existing optical system are discussed below.

FIG. 15 is a diagram illustrating the MTF response obtained if an object is in focus and when the object is out of focus in the existing optical system.

FIG. 16 is a diagram illustrating the MTF response obtained if an object is in focus and if the object is out of focus in the optical system comprising an optical wavefront modulation element according to the present embodiment.

FIG. 17 is a diagram illustrating the MTF response obtained after data reconstruction in the image pickup apparatus according to the present embodiment.

In FIGS. 15 to 17, the horizontal axes represent normalized frequency with using the Nyquist frequency and the vertical axes represent MTF.

In FIGS. 15 to 17, dashed curves CV11, CV21 and CV31 with broken lines show MTF obtained when the object is out of focus, and solid lines CV12, CV22 and CV32 show MTF obtained when the object is in focus (focused).

In the optical system including the optical wavefront modulation element, as is understood by curves CV11, CV21 and CV31 with the broken lines, variation in the MTF response obtained when the object is out of focus is smaller than that in an optical system free from the optical wavefront modulation element.

The MTF response is increased by subjecting the image formed by the optical system to a convolution operational processing in the convolution operation unit 242 in the image processing module 240.

An absolute value of the OTF (MTF) of the optical system including the optical wavefront modulation element shown in FIG. 16 is preferably 0.1 or more at the Nyquist frequency. The reason for this is described below. In order to obtain the OTF shown in FIG. 17 after reconstruction, the OTF gain of OTF is increased by using the reconstruction filter in the convolution operation unit 242. However, the noise of the detector is also increased. Therefore, reconstruction is preferably performed with increasing the OTF gain as low as possible in a high-frequency range around the Nyquist frequency.

In a normal optical system, sufficient resolution can be obtained if the MTF at the Nyquist frequency is 0.1 or more. Therefore, if the MTF value is 0.1 or more before reconstruction, it is not necessary to increase the OTF gain at the Nyquist frequency by the reconstruction filter. Contrary, if the MTF is less than 0.1 before reconstruction, the reconstructed image is largely influenced by noise that is not preferable.

The structure of the image processing module 240 which performs aforementioned processes is described below.

As shown in FIG. 3, the image processing module 240 comprises a raw buffer memory 241, a two-dimensional convolution operating unit 242, a kernel data storage ROM 243 as memory means, and a convolution controlling unit 244. The convolution controlling unit 244 is controlled by the control module 290 so as to perform a control such as turning on/off the convolution operation, controlling the screen size, switching kernel data and so on.

As shown in FIGS. 18, 19, and 20, the kernel data storage ROM 243 stores kernel data for the convolution that are calculated on the basis of the PSF of each optical system which is prepared in advance, and/or operating coefficients. The convolution control unit 244 acquires exposure information RP which is determined when the exposure setting is made by the control module 290, and selects the kernel data stored in the ROM 243 on a basis of a switching signal SW corresponding to the exposure information RP. The exposure information RP includes aperture information that indicates the aperture state of the aperture 214 in the optical system 210. The aperture state of the aperture stop 214 is controlled by the control module 290 depending on the exposure.

In the example shown in FIG. 18, kernel data KA corresponds to an optical magnification of 1.5, kernel data KB corresponds to an optical magnification of 5, and kernel data KC corresponds to an optical magnification of 10.

In the example shown in FIG. 19, kernel data KA corresponds to an F number (2.8), which is the aperture information, and kernel data KB corresponds to an F number (4).

In the example shown in FIG. 20, kernel data KA corresponds to an object distance of 100 mm, kernel data KB corresponds to an object distance of 500 m, and kernel data KC corresponds to an object distance of 4 m.

Switching Process of Karnel Data

Figure 21:
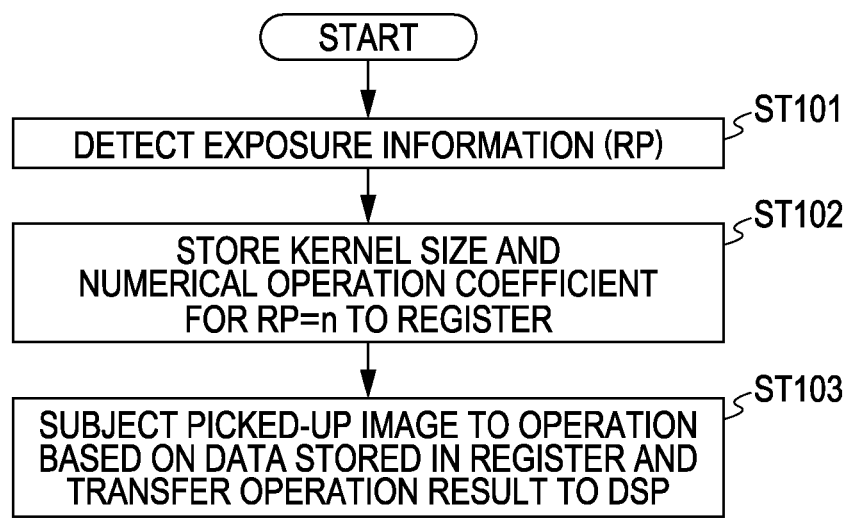
FIG. 21 is a flowchart schematically illustrating optical-system setting process in the control module illustrated in FIG. 3.

FIG. 21 is a flowchart showing a switching process of the kernel data based on the exposure information RF (including the aperture information) from the control module 290. First, in the control module 290, for example, exposure information RP is detected from the degree of the aperture of the aperture stop 214, and is supplied to the convolution control unit 244 (ST101). The convolution controller 244 sets the kernel size and the numerical operation coefficient stored in the kernel data storage ROM 243 in response to a switching signal SW on the basis of the exposure information RP, reads the selected kernel size and the selected numerical operation coefficient from the ROM 243, and sets them in a register in the two-dimensional convolution operating unit 242 (ST102). The image data obtained by the detector 220 and input to the two-dimensional convolution operator 242 via the AFE 230 is subjected to the convolution operation based on the numerical operation coefficient stored in the register. Then, the data converted by the operation is transmitted to the signal processor 250 (ST103).

The signal processing unit and the kernel data storage ROM of the image processing module 240 are described with specific examples below.

Figure 22:
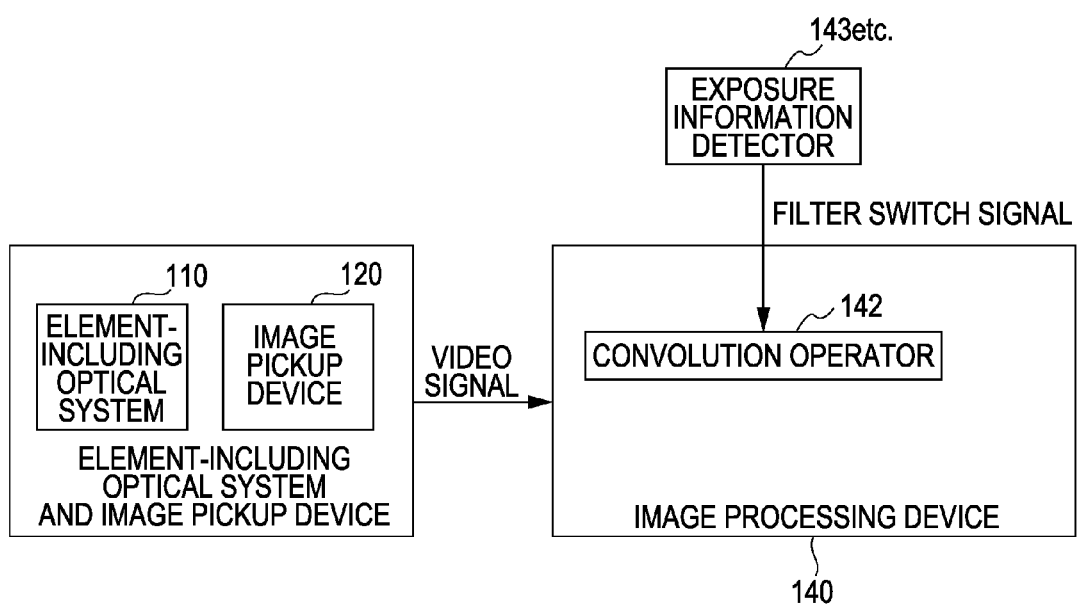
FIG. 22 is an illustration of first example of signal processing means in the image signal processing module illustrated in FIG. 3.

FIG. 22 is an illustration of first example of the signal processing module and the kernel data storage ROM. For simplicity, the AFE unit 232 and the like are omitted. The example in FIG. 22 is a block diagram corresponding to the case in which filter kernel data is prepared in advance in association with the exposure information RP.

The image processing module 240 receives the exposure information RF that is determined when the exposure settings are made from an exposure information detector 253, and controls the selection of kernel data stored in the kernel storage ROM 243 through the convolution controller 244. The two-dimensional convolution operator 242 performs the convolution operation using the kernel data.

Figure 23:
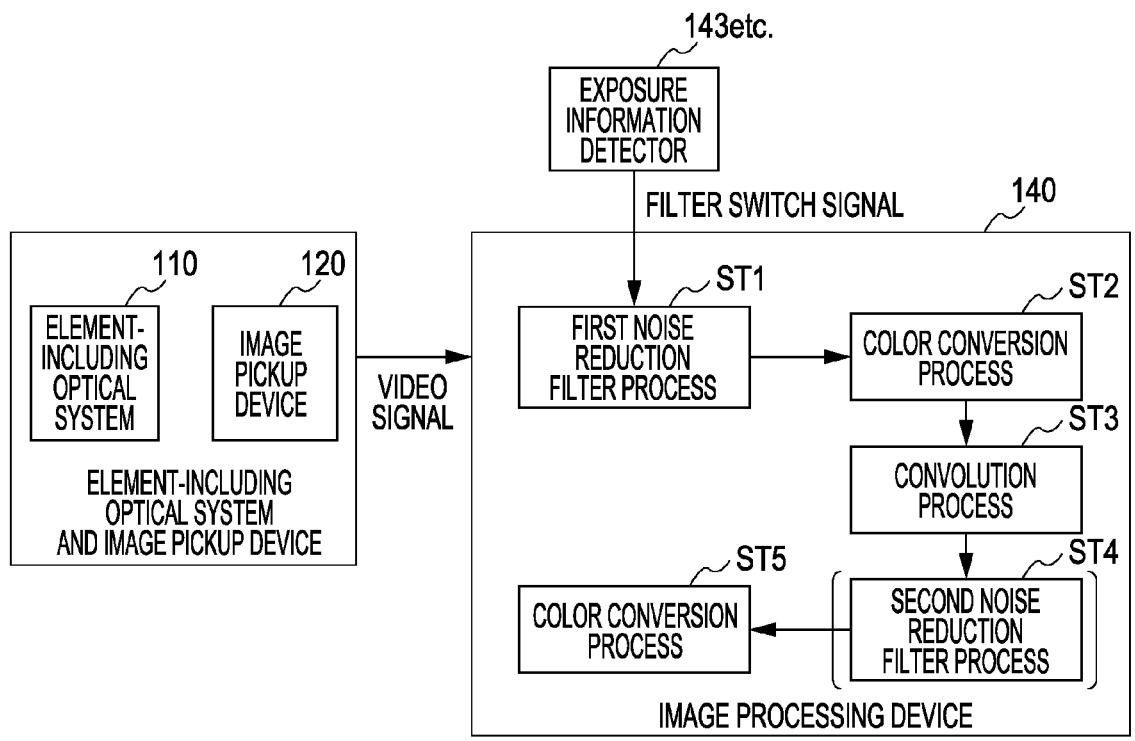
FIG. 23 is an illustration of second example of signal processing means in the image signal processing module illustrated in FIG. 3.

FIG. 23 is an illustration of second example of the signal processing module and the kernel data storage ROM. For simplicity, the AFE unit 232 and the like are omitted. The example shown in FIG. 23 is a block diagram in a case in which the process performed by the image processing module 240 comprises at first a noise-reduction filtering process and in which the first noise-reduction filtering process ST1 is prepared in advance as the filter kernel data in association with the exposure information.

The exposure information RP determined when the exposure settings are made is acquired by the exposure information detector 253 and the kernel data is controlled and selected through the convolution controller 244. In the two dimensional operation unit 242, after the noise-reduction filtering process (step ST1), by a color conversion process (step ST2) the color space is converted, and then the convolution operation (OTF reconstruction filtering process) or a (step ST3) is performed with using the kernel data. Then, another noise-reduction filtering process (2) or a (step ST4) is performed and the color space is returned to the original color space by a color conversion process (step ST5). As the color conversion process, for example, a conversion (brightness Y–color difference CbCr) is named. However, other kinds of conversion processes may also be performed. Another noise-reduction filtering process (step ST4) can be omitted.

Figure 24:
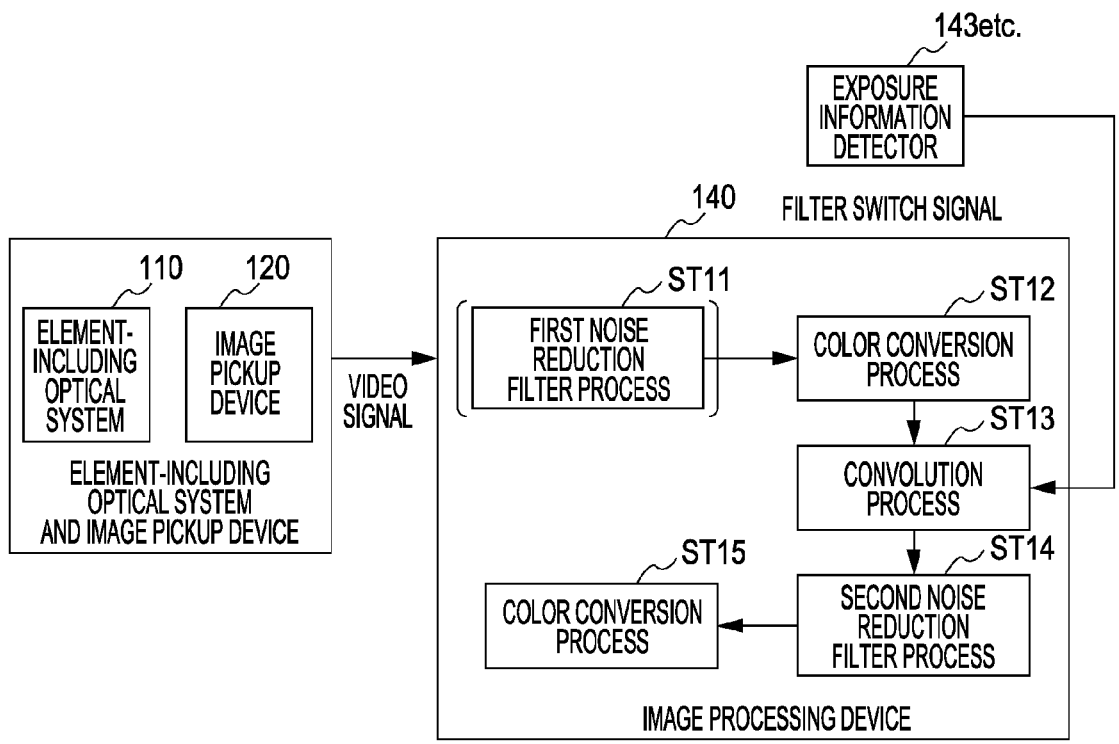
FIG. 24 is an illustration of third example of signal processing means in the image signal processing module illustrated in FIG. 3.

FIG. 24 is an illustration of third example of the signal processing module and the kernel data storage ROM. For simplicity, the AFE unit 232 and the like are omitted. The example shown FIG. 24 is a block diagram in a case in which an OTF reconstruction filter is prepared in advance in association with the exposure information.

The exposure information PR determined when the exposure settings are made is obtained by the exposure information detector 253 and the kernel data stored in the ROM 243 is controlled for selecting through the convolution controller 244. After the noise-reduction filtering process (1) (step ST11), a color conversion process (step ST12), the two-dimensional convolution operation unit 242 performs a convolution operation (step ST13) using the OTF reconstruction filter. Then, another noise-reduction filtering process (2) (step ST14) is performed and the color space is returned to the original state by a color conversion process (step ST15). As the color conversion process, for example, a conversion (brightness Y–color difference CbCr) is named. However, other kinds of conversion processes may also be performed. One of the noise-reduction filtering processes, the step ST11 and the step ST14 may be selected.

Figure 25:
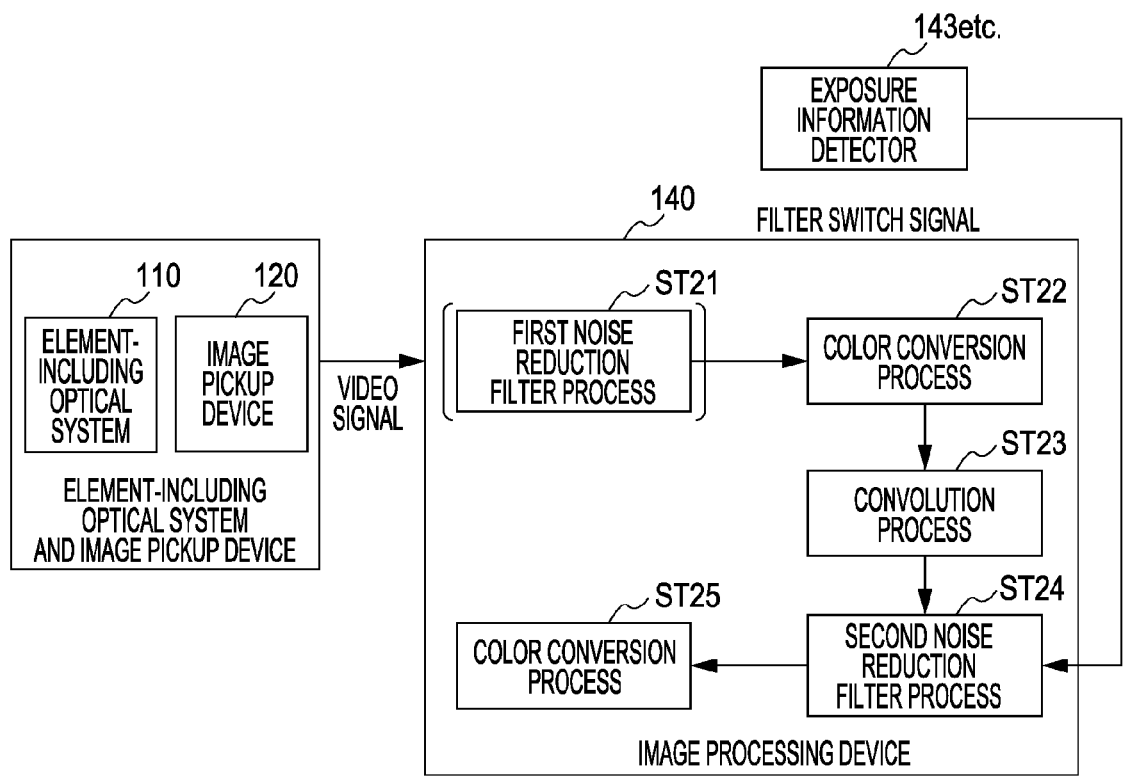
FIG. 25 is an illustration of fourth example of signal processing means in the image signal processing module illustrated in FIG. 3.
Figure 28A:
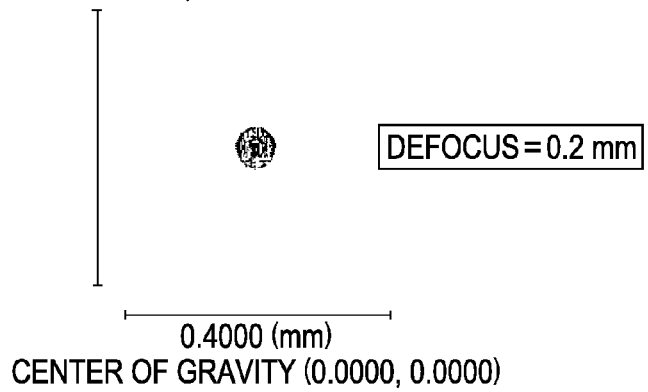
FIGS. 28A-C illustrate spot images formed on a light-receiving surface of a detector in the image-pickup lens apparatus shown in FIG. 27, FIG. 28A illustrate a spot image when a focal point is displaced to plus (+) side, FIG. 28B illustrate a spot image in focus, FIG. 28C illustrate a spot image when a focal point is displaced to minus (−) side.
Figure 28B:
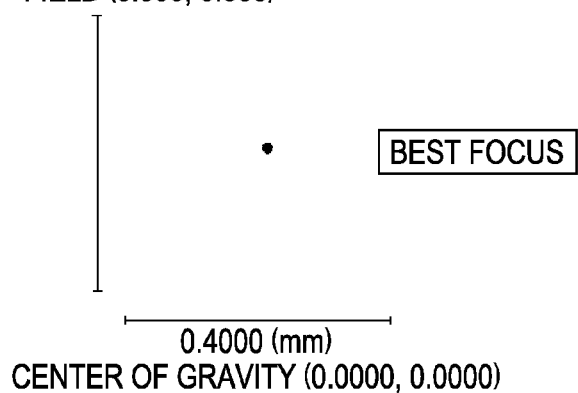
Figure 28C:
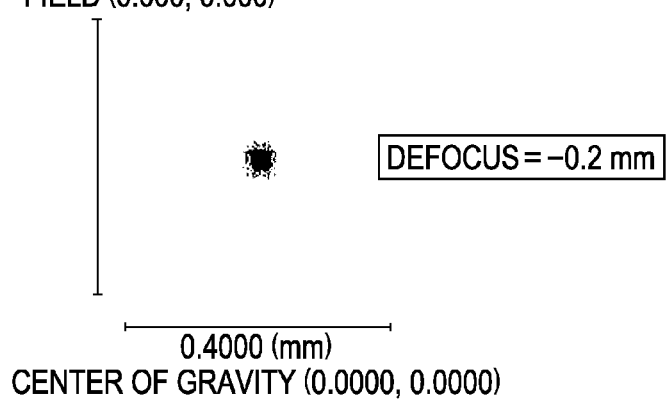

FIG. 25 is an illustration of fourth example of the signal processing module and the kernel data storage ROM. For simplicity, the AFE unit 232 and the like are omitted. The example shown FIG. 25 comprises steps for a noise-reduction filtering process, and is a block diagram in a case in which a noise reduction filter is prepared in advance in association with the exposure information RP. The exposure information RP determined when the exposure settings are made is acquired by the exposure information detector 253 and the kernel data is controlled for selecting through the convolution controller 244.

After performing a noise-reduction filtering process (1) (step ST21), the two-dimensional convolution operator 242 performs a color conversion process (step ST22) for converting the color space and then performs the convolution operation (step ST23) using the kernel data. Then, another noise-reduction filtering process (2) (step ST24) are performed in accordance with the exposure information RP and the color space is returned to the original state by a color conversion process (step ST25). As the color conversion process, for example, a conversion (brightness Y–color difference CbCr) is named. However, other kinds of conversion processes may also be performed. The first noise-reduction filtering process ST21 may also be omitted.

In the above-described examples, the filtering process is performed by the two-dimensional convolution operator 242 in accordance with only the exposure information RP. However, other methods can be used. For example, the exposure information can be used in combination with, for example, object distance information, zoom information, or shooting-mode information so that a more suitable operation coefficient can be extracted or a suitable operation can be performed.

FIG. 26 is an exemplary configuration of an image processing module in which the object distance information and the exposure information are used in combination.

An image pickup apparatus 200A comprises a convolution device 401, a kernel/coefficient storage register 402, and an image processing operation unit 403.

In the image pickup apparatus 200A, the image processing operation unit 403 reads information regarding an approximate distance to the object and exposure information RP from an object-distance-information detection device 500, and stores a kernel size and its coefficient which are for use in an operation suitable for the object position in the kernel/coefficient storage register 402. The convolution device 401 performs the suitable operation using those values stored in the register 402 so as to reconstruct the image. In the present embodiment, a distance to the main object is detected by the object-distance-information detection device 500 which includes a distance detection sensor. Then, it is configured such that a different image correction process is performed in accordance with a detected distance.

The above-described image processing is performed by the convolution operation by the convolution operation unit 242. To achieve the convolution operation, a single, common operation coefficient for convolution operation may be stored and a correction coefficient may be stored in advance in association with the focal distance, the operation coefficient is corrected using the correction coefficient so that a suitable convolution operation can be performed using the corrected coefficient. Alternatively, the following structures may also be used.

In an embodiment of the present invention, the following modification can be taken.

(1) Modification 1

A kernel size and an operation coefficient for the convolution are stored in advance in association with the focal distance, and the convolution operation is performed using the thus-stored kernel size and coefficient.

(2) Modification 2

A operation coefficient is stored in advance as a function of focal distance, the operation coefficient is calculated from the function in accordance with the focal distance, and the convolution operation is performed using the calculated operation coefficient.

More specifically, in the apparatus shown in FIG. 26, the following structure may be used.

CONFIGURATION EXAMPLE 1

The kernel/coefficient storage register 402 that functions as conversion-coefficient storing means stores at least two conversion coefficients corresponding to the aberration caused by at least a resin lens corresponding to the phase plate in association with the object distance. The image processing operation unit 403 functions as coefficient-selecting means for selecting one operation coefficient corresponding to a distance from the kernel/coefficient storage register 302 to the object on the basis of information generated by the object-distance-information detection device 500 that functions as object-distance-information generating means. Then, the convolution device 401, which functions as converting means, converts the image signal using the conversion coefficient selected by the image processing operation unit 403 which functions as the coefficient-selecting means.

CONFIGURATION EXAMPLE 2

Alternatively, as described above, the image processing operation unit 403 that functions as conversion-coefficient calculating means calculates the conversion coefficient on the basis of the information generated by the object-distance-information detection device 500 which functions as the object-distance-information generating means and the calculated conversion coefficient is stored in the kernel/coefficient storage register 402. Then, the convolution device 401, which functions as the converting means, converts the image signal using the conversion coefficient obtained by the image processing operation unit 403 which functions as the conversion-coefficient calculating means and stored in the kernel/coefficient storage register 402.

CONFIGURATION EXAMPLE 3

Alternatively, the kernel/coefficient storage register 402 functions as correction-value storing means stores in advance at least one correction value in association with a zoom position or an amount of zoom of the zoom optical system 210. The correction value includes a kernel size of an object aberration image. Then, the image processing operation unit 403 that functions as correction-value selecting means selects a correction value that corresponds to the distance from the kernel/coefficient storage register 302 that functions as the correction-value storing means to an object on the basis of the distance information generated by the object-distance-information detection device 500 that functions as the object-distance-information generating means. The convolution device 401, which functions as the converting means, converts the image signal using the conversion coefficient obtained from the kernel/numerical operation coefficient storage register 402, which functions as the second conversion-coefficient storing means, and the correction value selected by the image processing operation processor 403, which functions as the correction-value selecting means.

As described above, according to the present embodiment, the image pickup apparatus comprises the optical system 210 and the detector 220 for forming a first image, and the image processing module 240 for forming a final high-definition image from the first image. The optical system 210 includes a lens which comprises an optical wavefront modulation element or an optical wavefront modulation surface for reducing the OTF change in accordance with the object distance (difference in the object distance). An absolute value of the focal length of the optical wavefront modulation element or an optical wavefront modulation surface (or a lens comprising an optical wavefront modulation surface) is larger than the absolute value of the focal length of the entire optical system. As described above, the following advantages can be obtained. An influence of optical wavefront modulation such as aberration is reduced at the periphery portion of the screen and the difference between the sizes of the spot images at the center of the screen and the periphery portion of the screen can be small. As a result, a uniform image quality is obtained in the whole screen whether the position is at the screen center or the screen periphery.

In the present embodiment, an optical system is formed such that an optical wavefront modulation surface of an optical wavefront modulation element is rotationally symmetrical around an optical axis and the "phase shape" increases or decreases in monotone from a center portion to a periphery portion. As a result, by setting an optical wavefront modulation surface rotationally symmetrical around an optical axis and generating a spherical aberration larger than an existing optical system, an OTF change in accordance with the object distance can be small compared to an existing optical system.

In addition, by forming such that the "phase shape" increases or decreases in monotone from the center to a periphery of a screen, a spot image can be small while maintaining the effect of making an OTF change in accordance with the object distance small. Furthermore, in the present embodiment, by setting the focal distance of an optical wavefront modulation surface larger than the focal distance of an entire optical system 210, OTF can be uniform from a center to a periphery of a screen. Moreover, by setting the focal distance of an optical wavefront element (a lens) comprising an optical wavefront modulation surface larger than the focal distance of an entire optical system 210, OTF can be uniform from a center to a periphery of a screen. Additionally, the configuration of the optical system 210 can be simplified and the costs can be reduced. Furthermore, a high-quality reconstruction image in which the influence of noise is small can be obtained. Good restored images, that is less influenced by noise, with appropriate image quality and can be obtained. The image pickup apparatus can be manufactured easily, and a high precision is not required for assembly of lenses in an optical system. An image pickup apparatus in which the influence of reflection is suppressed and contrast depending on directions in an image cam be same can be realized.

The kernel size used in the convolution operation and the coefficient used in the numerical operation are variable and inputted from the operating unit 280 shown in FIG. 3 and the like, and suitable kernel size and the abovementioned coefficient are corresponded thereto. Accordingly, there is an advantage that the lens design without taking the magnification and defocus area into account can be performed and the reconstructed image can be obtained by the convolution operation with high accuracy. There is an advantage that a natural image can be obtained without using an expensive, large optical lens having high difficulty in manufacturing and without moving a lens in the optical radius 210. The image pickup apparatus 200 according to the present embodiment can be applied to a small, light, inexpensive WFCO optical system which is required for use in electronic devices such as digital cameras, camcorders and the like. In addition, the structure of the optical system 210 can be simplified, the optical system 210 can be easily manufactured, and the costs can be reduced.

If a CCD or a CMOS sensor is used as the detector, the resolution has a limit determined by the pixel pitch. If the resolution of the optical system is equal to or more than the limit, phenomenon like aliasing occurs and adversely affects the final image of the image pickup apparatus. Although the contrast is preferably set as high as possible to improve the image quality, a high-performance lens system is required for its purpose.

Aliasing occurs, if a CCD or a CMOS sensor is used as the detector. In an image pickup apparatus, to avoid the occurrence of aliasing, a low-pass filter composed of a uniaxial crystal system is additionally used and the aliasing is avoided. Although the additional use of the low-pass filter is correct in principle, since the low-pass filter is made of crystal, the low-pass filter is expensive and is difficult to manage a temperature. In addition, when used in an optical system, the structure of the optical system becomes more complex.

As described above, although images with higher definitions are demanded, the complexity of the optical system must be increased to form high-definition images in the known image pickup apparatus. The manufacturing process becomes difficult when the optical system becomes complex, and the costs are increased when an expensive low-pass filter is used. However, according to the present embodiment, as described above, aliasing can be avoided and high-definition images can be obtained without using the low-pass filter.

The abovementioned embodiments are only examples. For example, the kernel data storage ROM is not limit to be used for the optical magnification, the F number and each kernel size, and the object distance value, as shown in FIGS. 18, 19, and 20. In addition, the number of kernel data to be prepared for the convolution operation is not limited to three.

When practicing the present invention, the present invention is not limited to the above-described embodiments and can be practiced substantially same as the above-described embodiment and various alternations and modifications to the above embodiments are used.

The optical system according to the present invention can be applied to a variety of image pickup apparatus as well as the abovementioned image pickup apparatus. In addition, the image pickup apparatus according to the present invention is not limited to apply the information code reading apparatus, but can be apply to the image processing apparatus.

The invention claimed is:

1. An image pickup apparatus, comprising:
an optical system comprising an optical element including an optical wavefront modulation function; and
a detector at a focal position of the optical system, operable to capture an object image,
wherein the optical element is operable to decrease an alteration of an optical transfer function in a entire screen due to a difference of object distances, and
wherein an absolute value of a focal length of the optical element is greater than an absolute value of a focal length of the entire optical system.

2. The image pickup apparatus according to claim 1, wherein the optical element including an optical wavefront modulation function generates a dispersed image that is obtained by dispersing the object image on an imaging surface of the detector.

3. The image pickup apparatus claim 2, wherein
the image pickup apparatus further comprises an image processing module configured to subject the dispersed object image from the detector having captured the image dispersed by the optical element including the optical wavefront modulation function to a signal processing for restoring a dispersion-free image.

4. The image pickup apparatus according to claim 3, wherein the image processing module is operable to perform a convolution operation and restore a dispersion-free image.

5. The image pickup apparatus according to claim 4, wherein
the image processing module is operable to:
subject the dispersed image to a color convolution operation; and
restore an optical transfer function for the result of the color convolution operation.

6. The image pickup apparatus according to claim 5, wherein the image processing module is operable to perform a convolution operation using a kernel data and a process for restoring the optical transfer function.

7. The image pickup apparatus according to claim 6, wherein the kernel data is an optical magnification, aperture or object distance information.

8. The image pickup apparatus according to claim 7, wherein the kernel data comprises a plurality of data that is defined in response to a state of exposure, and the image processing module is operable to perform the abovementioned process by selecting a kernel data in response to an exposure.

9. The image pickup apparatus according to claim 8, wherein the image pickup apparatus controls the process in the image processing module by adjusting the exposure by adjusting the aperture of the aperture stop within the optical system and by selecting the kernel data in response to the adjusted exposure.

10. The image pickup apparatus according to claim 1, wherein the optical system further comprises an aperture stop and the aperture stop is arranged at a position near a light exit side or a light entry side of the optical element including an optical wavefront modulation function.

11. The image pickup apparatus according to claim 1, wherein the optical element comprises an optical wavefront modulation component located at a light exit surface or a light entry surface of a lens.

12. The image pickup apparatus according to claim 11, wherein the aperture stop is located at a position adjacent to a light exit side or a light entry side of the optical element.

13. The image pickup apparatus according to claim 11, wherein the optical element has a phase shape which is rotationally symmetrical around an optical axis of the optical system and increases or decreases in monotone from the optical axis toward a periphery portion, where the phase shape is defined as a difference between a shape of the lens with the optical wavefront modulation component and a shape of the lens without the optical wavefront modulation component.

14. The image pickup apparatus according to claim 11, wherein the optical system further comprising a cemented lens that is combined by a plano-concave lens and a biconvex lens at a position adjacent to the aperture stop and at a light exit side of the optical system.

15. The image pickup apparatus according to claim 1, wherein the aperture stop is operable to change the aperture.

16. The image pickup apparatus according to claim 1, wherein the optical system further comprises a lens that makes the light entering the optical element parallel to an optical axis at a light entry side of the optical element.

17. A code reading device comprising the image pickup apparatus according to claim 1, wherein the code reading device reads information codes optically.

18. The code reading device according to claim 17, wherein the information codes to be read by the code reading device are one-dimensional barcodes, stack-type codes or two-dimensional barcodes.

19. A optical system, comprising an optical element including an optical wavefront modulation function, wherein the optical element including an optical wavefront modulation function has a capability of decreasing an alteration of an optical transfer function in a whole screen due to a difference in object distance, and wherein an absolute value of a focal length of the optical element including the optical wavefront modulation function is greater than an absolute value of a focal length of the entire optical system.

\* \* \* \* \*